United States Patent
Pandelisev

(10) Patent No.: US 7,797,966 B2
(45) Date of Patent: Sep. 21, 2010

(54) HOT SUBSTRATE DEPOSITION OF FUSED SILICA

(75) Inventor: Kiril A. Pandelisev, Mesa, AZ (US)

(73) Assignee: Single Crystal Technologies, Inc., Mesa, AZ (US)

( * ) Notice: Subject to any disclaimer, the term of this patent is extended or adjusted under 35 U.S.C. 154(b) by 1376 days.

(21) Appl. No.: 09/880,943

(22) Filed: Jun. 15, 2001

(65) Prior Publication Data

US 2002/0083741 A1     Jul. 4, 2002

Related U.S. Application Data

(60) Provisional application No. 60/258,494, filed on Dec. 29, 2000.

(51) Int. Cl.
   C03B 19/14    (2006.01)
(52) U.S. Cl. .............. 65/416; 65/417; 65/421
(58) Field of Classification Search ........... 65/416, 65/417, 421, 413, 414, 436, 477, 397, 398, 65/399; 423/335, 336, 337; 118/715, 729, 118/730; 427/255.11; 239/136
   See application file for complete search history.

(56) References Cited

U.S. PATENT DOCUMENTS

| | | | |
|---|---|---|---|
| 3,370,921 A | 2/1968 | Wagstaff | |
| 3,461,836 A * | 8/1969 | Henker | 118/725 |
| 3,576,932 A | 4/1971 | Biddulph | |
| 3,619,440 A | 11/1971 | Gray | |
| 3,620,702 A | 11/1971 | DeKalb et al. | |
| 3,620,704 A | 11/1971 | Gray | |
| 3,644,607 A | 2/1972 | Roques | |
| 3,698,936 A | 10/1972 | Moltzan | |
| 3,713,854 A | 1/1973 | Beall | |
| 3,741,796 A | 6/1973 | Walker | |
| 3,784,386 A | 1/1974 | Araujo et al. | |
| 3,806,570 A | 4/1974 | Flamenbaum et al. | |
| 3,814,620 A | 6/1974 | Bailey et al. | |
| 3,839,054 A | 10/1974 | Forker, Jr. et al. | |
| 3,848,152 A | 11/1974 | Schultz | |
| 3,971,645 A | 7/1976 | Bachmann et al. | |
| 4,033,780 A | 7/1977 | Baumgartner et al. | |
| 4,059,658 A | 11/1977 | Shoup et al. | |
| 4,062,318 A * | 12/1977 | Ban et al. | 118/725 |
| 4,090,055 A | 5/1978 | King | |
| 4,112,032 A | 9/1978 | Blaszyk et al. | |

(Continued)

FOREIGN PATENT DOCUMENTS

EP         0448155        10/1984

(Continued)

*Primary Examiner*—Carlos Lopez
(74) *Attorney, Agent, or Firm*—Kenealy Vaidya LLP

(57) ABSTRACT

Fused silica injected or created by pyrolysis of $SiCl_4$ are introduced in a powder state into a vacuum chamber. Pluralities of jet streams of fused silica are directed towards a plurality of heated substrates. The particles attach on the substrates and form shaped bodies of fused silica called preforms. For uniformity the substrates are rotated. Dopant is be added in order to alter the index of refraction of the fused silica. Prepared soot preforms are vitrified in situ. Particles are heated, surface softened and agglomerated in mass and are collected in a heated crucible and are softened and flowed through a heated lower throat. The material is processed into quartz plates and rods for wafer processing and optical windows.

61 Claims, 22 Drawing Sheets

U.S. PATENT DOCUMENTS

| | | | |
|---|---|---|---|
| 4,125,389 A | 11/1978 | King | |
| 4,157,253 A | 6/1979 | Hernqvist | |
| 4,286,981 A | 9/1981 | Clasen et al. | |
| 4,292,063 A * | 9/1981 | Abe | 65/417 |
| RE30,883 E | 3/1982 | Rau et al. | |
| 4,428,762 A * | 1/1984 | Andrejco et al. | 65/414 |
| 4,432,781 A | 2/1984 | Okamoto et al. | |
| 4,437,727 A | 3/1984 | Treber | |
| 4,523,939 A | 6/1985 | Jenkins et al. | |
| 4,643,751 A | 2/1987 | Abe | |
| 4,682,995 A | 7/1987 | Clasen | |
| 4,684,385 A | 8/1987 | Clasen | |
| 4,684,386 A | 8/1987 | Clasen | |
| 4,684,387 A | 8/1987 | Clasen et al. | |
| 4,689,066 A | 8/1987 | Clasen et al. | |
| 4,707,173 A * | 11/1987 | Kawazoe et al. | 65/414 |
| 4,726,828 A | 2/1988 | Clasen | |
| 4,735,644 A * | 4/1988 | Schneider | 65/421 |
| 4,747,863 A | 5/1988 | Clasen et al. | |
| 4,761,170 A * | 8/1988 | Mansfield | 65/391 |
| 4,813,989 A | 3/1989 | Uchiyama et al. | 65/489 |
| 4,816,051 A | 3/1989 | Clasen et al. | |
| 4,826,521 A | 5/1989 | Wiechmann et al. | |
| 4,834,786 A * | 5/1989 | Yamauchi et al. | 65/412 |
| 4,848,998 A | 7/1989 | Snitzer et al. | |
| 4,859,224 A | 8/1989 | Clasen | |
| 4,860,687 A * | 8/1989 | Frijlink | 118/500 |
| 4,866,857 A | 9/1989 | Clasen | |
| 4,888,036 A | 12/1989 | Clasen | |
| 4,923,497 A | 5/1990 | Leber et al. | |
| 4,929,579 A | 5/1990 | Lassiter | |
| 4,961,699 A * | 10/1990 | Moore | 425/387.1 |
| 4,981,435 A | 1/1991 | Clasen et al. | |
| 5,049,175 A | 9/1991 | Röss et al. | |
| 5,090,980 A | 2/1992 | Clasen | |
| 5,096,865 A | 3/1992 | Dunworth | |
| 5,120,444 A | 6/1992 | Clasen | |
| 5,152,819 A | 10/1992 | Blackwell et al. | |
| 5,171,343 A | 12/1992 | Leber et al. | |
| 5,182,052 A | 1/1993 | Lydtin et al. | |
| 5,248,638 A | 9/1993 | Elmer et al. | |
| 5,256,855 A | 10/1993 | Heanley et al. | |
| 5,300,466 A | 4/1994 | Elmer et al. | |
| 5,395,413 A | 3/1995 | Sempolinski et al. | |
| 5,429,653 A | 7/1995 | Leber et al. | |
| 5,522,007 A | 5/1996 | Drouart et al. | |
| 5,616,159 A | 4/1997 | Araujo et al. | |
| 5,637,284 A | 6/1997 | Sato et al. | |
| 5,665,132 A | 9/1997 | Ruppert et al. | |
| 5,665,139 A | 9/1997 | Ruppert et al. | |
| 5,667,547 A | 9/1997 | Christiansen et al. | |
| 5,696,038 A | 12/1997 | Maxon | |
| 5,698,484 A | 12/1997 | Maxon | |
| 5,702,497 A | 12/1997 | Oh et al. | |
| 5,736,206 A | 4/1998 | Englisch et al. | |
| 5,738,702 A | 4/1998 | Ruppert et al. | |
| 5,747,113 A * | 5/1998 | Tsai | 427/255.5 |
| 5,764,345 A | 6/1998 | Fladd et al. | |
| 5,766,291 A | 6/1998 | Sato et al. | |
| 5,769,921 A | 6/1998 | Yokokawa | |
| 5,785,729 A | 7/1998 | Yokokawa et al. | |
| 5,790,736 A | 8/1998 | Fabian | |
| 5,837,024 A | 11/1998 | Fabian | |
| 5,892,876 A | 4/1999 | Desurvire et al. | |
| 5,895,515 A * | 4/1999 | Ishikawa et al. | 65/377 |
| 5,896,222 A | 4/1999 | Rosplock et al. | |
| 5,897,681 A | 4/1999 | Lysson et al. | |
| 5,931,984 A | 8/1999 | Drouart et al. | |
| 5,942,296 A | 8/1999 | Oh et al. | |
| 5,944,867 A | 8/1999 | Chesnoy et al. | |
| 5,970,083 A | 10/1999 | Orcel et al. | |
| 5,970,750 A | 10/1999 | Humbert et al. | |
| 5,972,115 A | 10/1999 | Maurin et al. | |
| 5,979,186 A | 11/1999 | Köppler et al. | |
| 5,979,189 A | 11/1999 | Campion et al. | |
| 5,993,899 A | 11/1999 | Robin et al. | |
| 6,007,786 A | 12/1999 | Campion et al. | |
| 6,026,207 A | 2/2000 | Reddy et al. | |
| 6,047,564 A | 4/2000 | Schaper et al. | |
| 6,047,568 A | 4/2000 | Campion | |
| 6,125,659 A | 10/2000 | Yang | |
| 6,134,922 A | 10/2000 | Shimada et al. | |
| 6,143,073 A | 11/2000 | Christman et al. | |
| 6,143,676 A | 11/2000 | Ohashi et al. | |
| 6,145,344 A | 11/2000 | Oyamada et al. | |
| 6,269,663 B1 | 8/2001 | Drouart et al. | |
| 6,449,986 B2 * | 9/2002 | Sugiyama et al. | 65/413 |
| 6,732,551 B2 * | 5/2004 | Tennent et al. | 65/414 |
| 2004/0231599 A1 * | 11/2004 | Schwambera et al. | 118/728 |

FOREIGN PATENT DOCUMENTS

| | | |
|---|---|---|
| EP | 0265023 | 4/1988 |
| EP | 0318100 | 5/1989 |
| EP | 0249278 | 3/1990 |
| EP | 0607433 | 7/1994 |
| EP | 0529189 | 11/1996 |
| EP | 0546196 | 5/1997 |
| EP | 0850890 | 7/1998 |
| EP | 0867531 | 9/1998 |
| EP | 0870737 | 10/1998 |
| EP | 0747327 | 3/1999 |
| EP | 0630866 | 7/1999 |
| EP | 0999189 | 5/2000 |
| WO | WO97/10184 | 9/1996 |
| WO | WO98/07053 | 2/1998 |
| WO | WO98/27140 | 6/1998 |

* cited by examiner

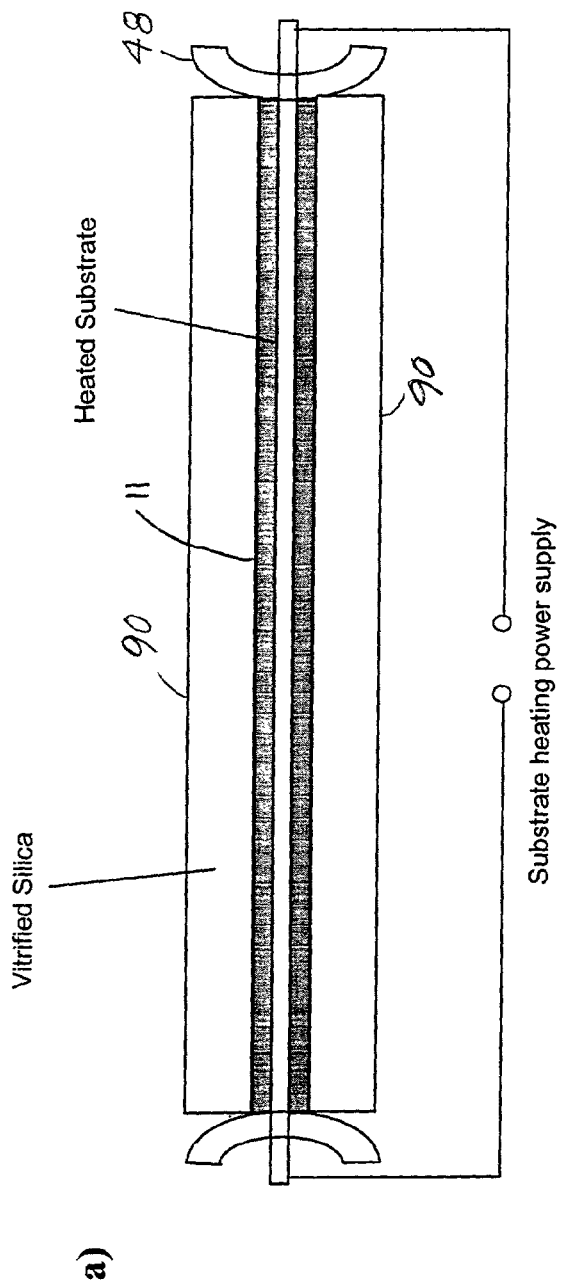
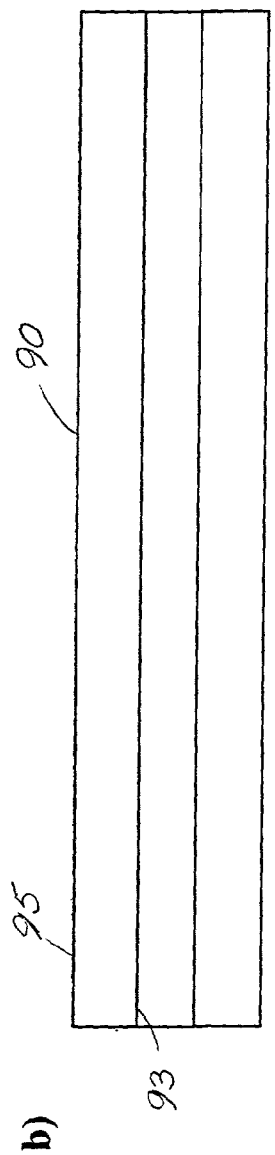
FIG. 9A
FIG. 9B

HOT SUBSTRATE DEPOSITION OF FUSED SILICA

This application claims the benefit of U.S. Provisional Application No. 60/258,494, filed Dec. 29, 2000.

SUMMARY OF THE INVENTION

Soot deposition on a plurality of substrates for fiber optic or any other high technology applications that require very high quality water-free synthetic fused silica such as optical wave guides, lenses and prisms for the deep ultraviolet spectrum are described here. Hot Substrate Deposition (HSD) of silica for fiber optic and other applications, processes and apparatus for superior quality synthetic fused silica fiber optic preforms that can be used in the MCVD (modified chemical deposition method) and OVD (outside vapor-phase deposition), VAD (vapor-phase axial deposition) applications are also part of this invention. The process allows for deposition of fused silica preforms of doped, undoped or modulation doped, and preforms in any radial profile of the index of refraction are also part of this invention. Controlled density of the deposited material as well as the provision for a plurality of substrates leads to increased productivity and higher yield production compared to the current processes for synthetic fused silica described in numerous patents. Water-free ultrapure synthetic fused silica having desired grain size is also part of this invention. Processes and apparatus for further processing of such synthetic fused silica into rods, tubes and plates for various applications are also part of this invention.

Fused silica and possibly various dopants are either created by pyrolysis of $SiCl_4$ or other compounds or they are introduced in a powder state into a vacuum chamber that might be at vacuum or desired pressure for the particular processes. Pluralities of jet streams of fused silica are directed towards a plurality of substrates heated to certain temperatures. The particles attach themselves on the substrates and form shaped bodies of fused silica called □preforms□. For uniformity purposes the substrates may be rotated clockwise (CW) or counterclockwise (CCW) and may be linearly moved with respect to the sources of fused silica streams. Fused silica streams from a fused silica powder or quartz powder may move with respect to the preform being fabricated. In one embodiment, the sources and preforms may both move linearly with respect to each other as well as relate with respect to each other. Depending on the substrate temperature of the silica preforms, the preforms may have different densities and states of compaction. Very thick layers are deposited in this way without cracking or peeling from the substrates. Dopant may be added in order to alter the index of refraction of the fused silica. If continuously added, the whole preforms may be doped. If added during certain time periods, one may create desired profiles of the index of refraction. The dopant may be added as part of the silica jet stream, through the surrounding deposition atmosphere or through the porous substrate. The dopant may be in solid, liquid or gaseous form.

Such prepared soot preforms are later vitrified in situ, or they are treated separately. Quartz material, doped, undoped, or preferentially doped to achieve a certain index of refraction profile is obtained. This material is further processed into quartz tubes for fiber optics and other applications, quartz rods for fused silica wafers for semiconductors and various optical applications and quartz plates for wafer processing and optical windows.

Processes and apparatus for making of metal oxides by oxidation of metal halides, formation of fiber optic preforms, doped and undoped, and making of high quality fused silica glass are described herein. Metal oxide, silicon dioxide in particular, is deposited on controlled temperature substrates made from graphite, silicon carbide, ceramic, quartz, metal and metal alloys. The substrates are tubular or rod-like in shape, having round, rectangular or polygonal cross-sections. The substrates and the deposited material are heated by means of resistive heating, RF heating or by any other means, and by any combination among them. The material is dried, doped (if needed), and densified. The material is later converted into high quality fused silica tubes, rods or quartz plates of desired sizes.

These and further and other objects and features of the invention are apparent in the disclosure, which includes the above and ongoing written specification, with the claims and the drawings.

BRIEF DESCRIPTION OF THE DRAWINGS

FIG. 9A shows vitrified silica on a heated substrate.

FIG. 9B shows a vitrified silica tube member.

As shown in FIG. 12, the deposition tube has a straight end. After the above deposition tube is aligned with the lower deposition tube and the two are rotated together, the upper deposition tube is heated by radio frequency heating of the graphite, carbon based or SiC based tube, or a graphite, carbon based or SiC based heater within the tube, to soften the inside of the cylindrical porous preform and allow the cylindrical porous preform to slide down along the aligned tubes, recharging the working preform position.

DETAILED DESCRIPTION OF THE PREFERRED EMBODIMENTS

The invention provides a controlled substrate temperature fused silica process and apparatus.

Process and apparatus for fused silica soot of desired size (doped and undoped), fiber optic preforms that are undoped, doped with the desired refractive index profile, or fully doped, fused silica tubes, fused silica fibers and rods and fused silica plates and fused silica members having desired shapes are described herein.

Figure 1:
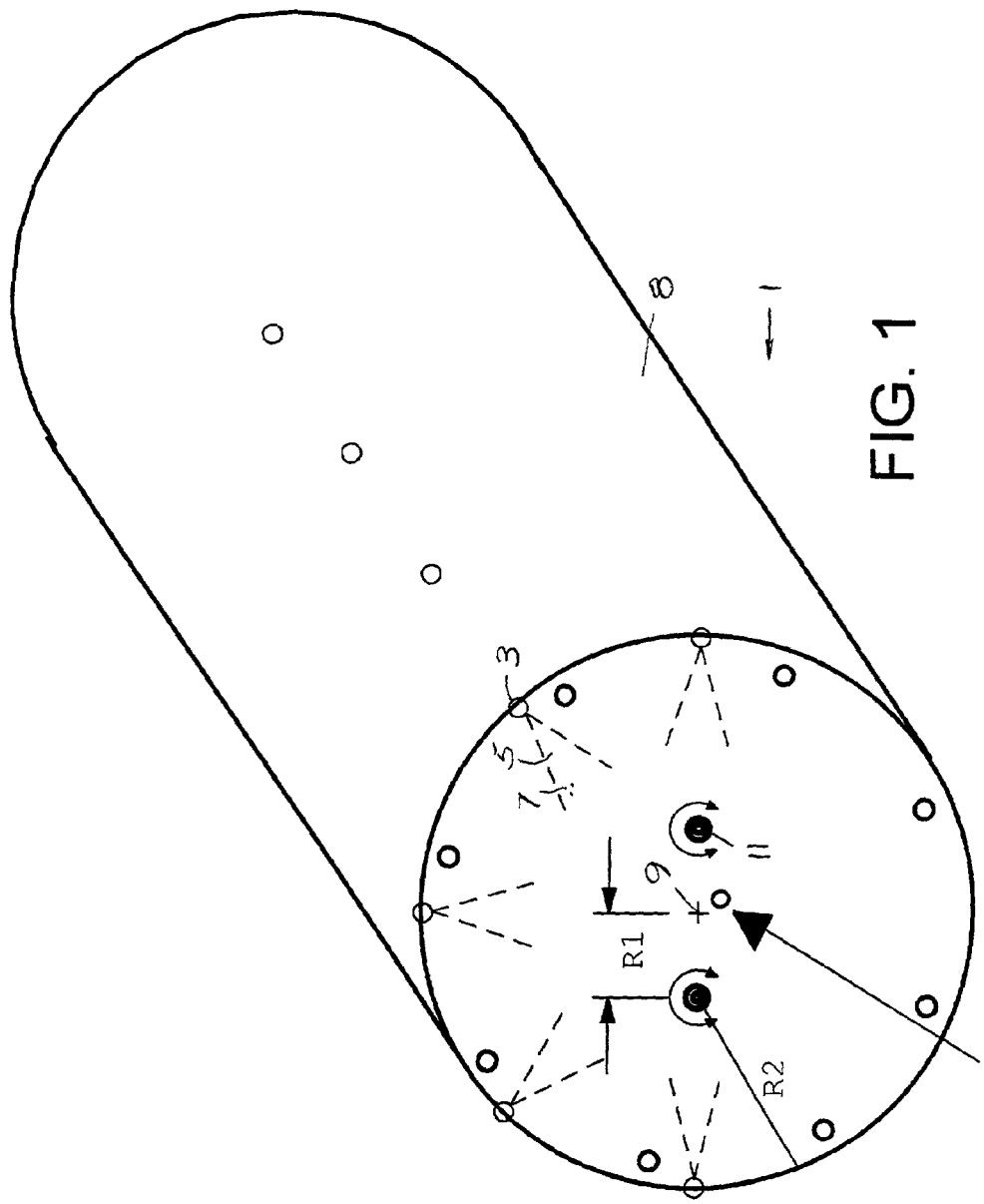
FIG. 1 is a schematic perspective representation of a porous preform-general chamber, which may be horizontal, vertical or any other position.
Figure 2:
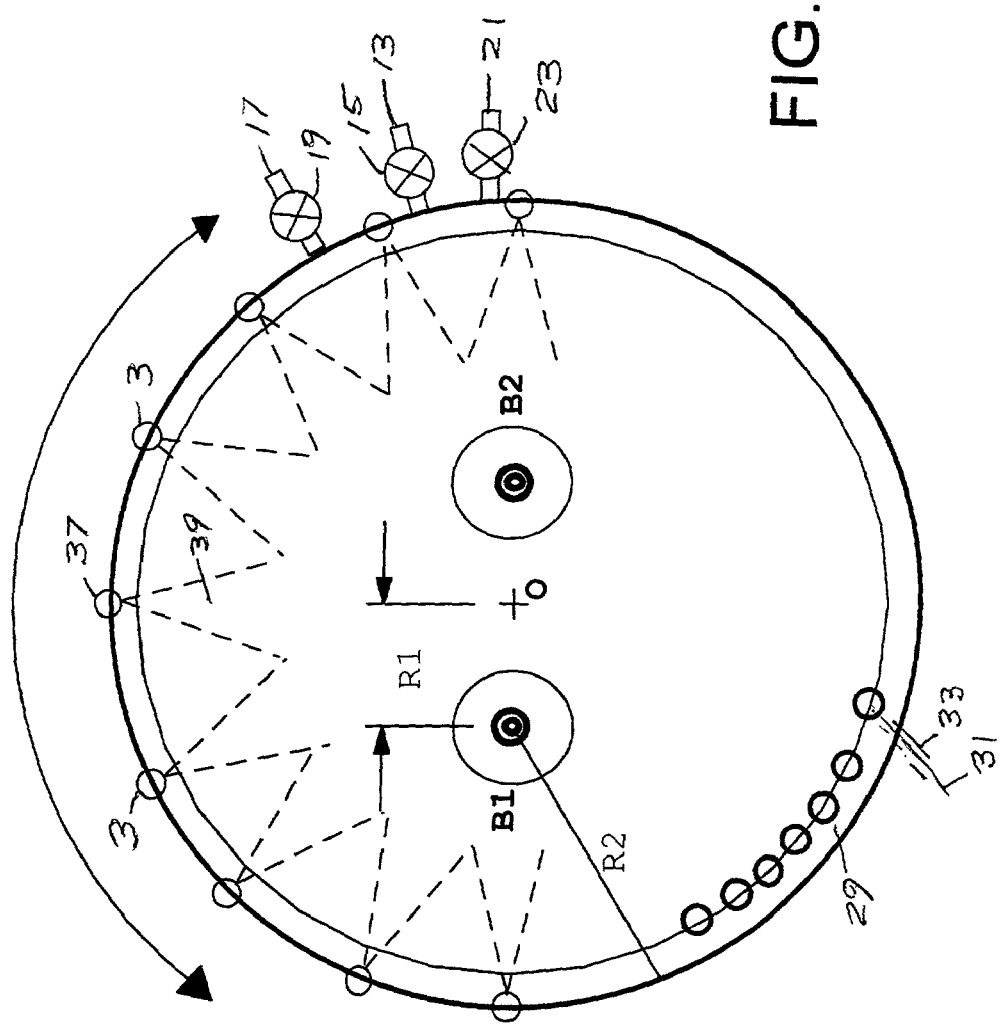
FIG. 2 shows a cross-sectional view of the chamber shown in FIG. 1, in which one or a plurality of deposition rods made from carbon, SiC, ceramic, graphite, metal or metal alloys, or combinations thereof may be rotated to collect the glass soot.
Figure 3:
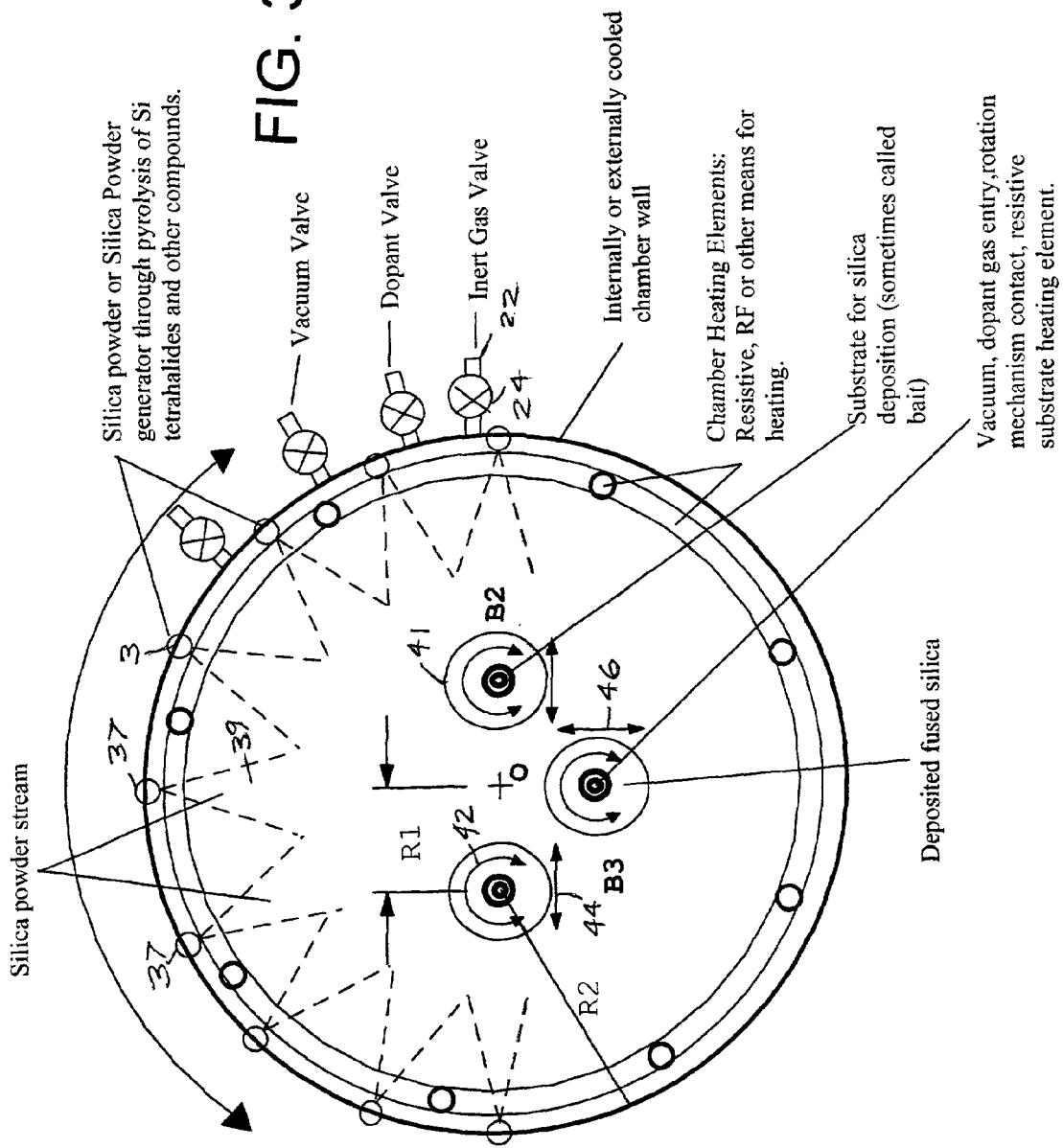
FIG. 3 is a cross-section showing spacing and movements of three or more substrates and preforms.

FIGS. 1, 2 and 3 show a plurality of substrates 11 at controlled temperature housed in a vacuum chamber 1. A plurality of silica stream generators 3 are shown. The silica powder stream generators 3 represent burners for oxidation of chemical compounds into fused silica powder or silica powder injection units. Powder is made in separate chambers, or natural quartz powder may be injected in the chamber for preform deposition. Generators 3, which may be burners for oxidation 5 of chemical compounds 7 such as SiCl4, SiF4 and others into fused silica particles, are either embedded in the chamber wall 8 or they are placed inside the chamber. The proximity of the silica particle providers or stream generators 3 to the collectors or substrates 11 as well as the distance of the substrates from the center 9 of the chamber are optimized based on the number of the substrates 11, the number of the silica stream generators 3 and their relative positions. The chamber 1 may have round, rectangular or any other suitable shape that is needed or is useful to optimize the process. Vacuum ports 13 with valves 15, vents 17 with valves 19 and a plurality of gas inlet ports 21 with valves 23 and inert gas ports 22 with valves 24 are also added to the chamber. The chamber may be vertical, horizontal, sloped and any other position or combination suitable for the new process. The chamber walls 8 may have a cooling jacket 25 for temperature control and appropriate venting apparatus for the gasses generated during the deposition. Appropriate openings are provided at one end, at each end or on one or two sides of the chamber for loading and unloading of the chamber.

A plurality of power feeds for resistive heating 29 or RF coils 31 and appropriate power feedthroughs 33 and shields 35 are also included in the chamber.

The chamber may have plurality of particle provider ports 37 for introduction of soot 39 made during another operation or natural quartz powder.

The chamber and the substrate assembly may be rotated in respect to each other clockwise or counterclockwise and may be relatively axially moved at certain desired speeds, which are determined empirically. Each substrate may be rotated around its axis clockwise or counterclockwise at certain desired speeds. All rotations are aimed at establishing conditions for good thickness and uniformity properties of the deposited material in the porous perform 41.

As shown in FIG. 3, substrates and preforms B1, B2 and B3 are spaced from a center by radius R1 and from the chamber wall by a greater radius R2. The substrates and preforms 41 are relatively rotated 42 and moved 44 and 46 initially or as the preforms grow.

Figure 4:
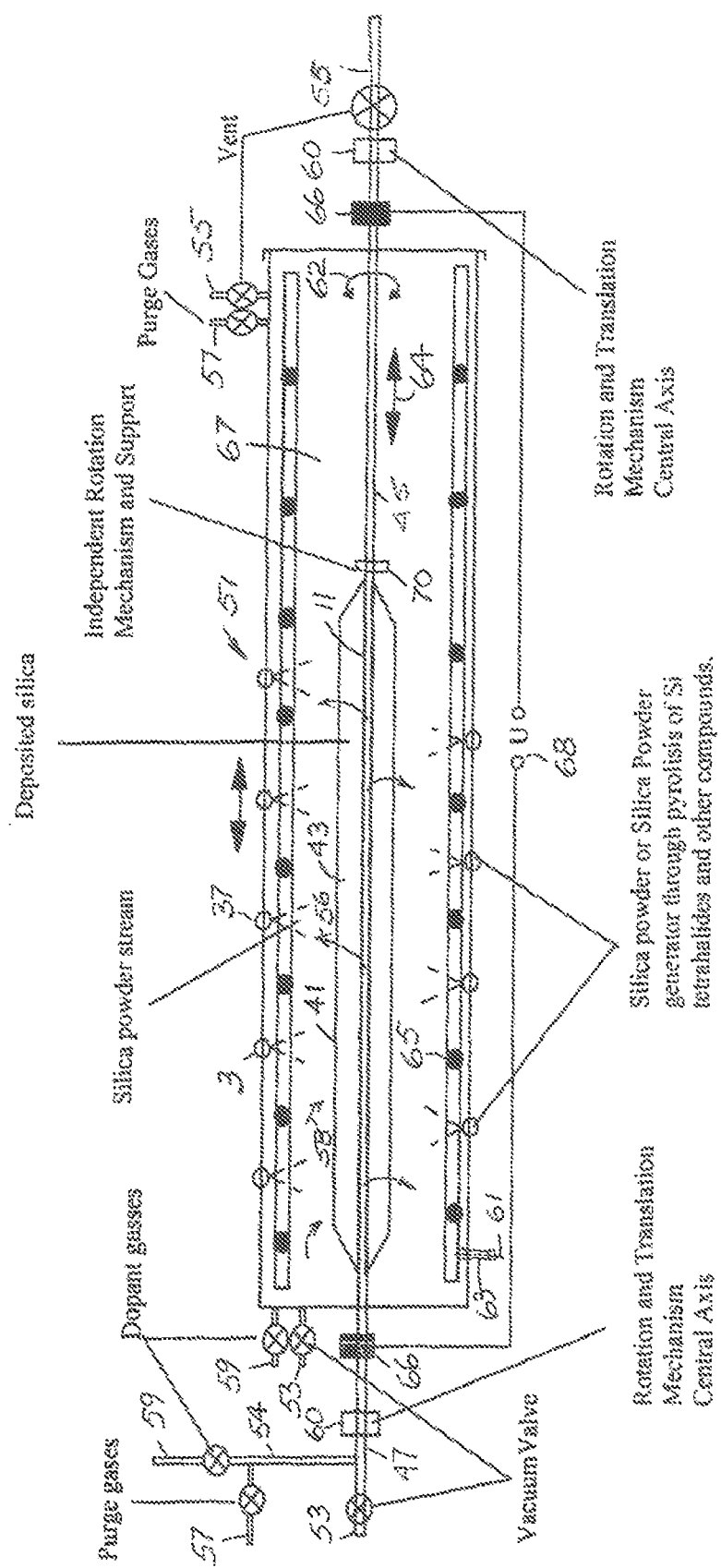
FIG. 4 is a longitudinal cross-section of the chamber showing relative longitudinal movements and rotations.

FIG. 4 shows a tubular substrate 11 with deposited material 43 forming a preform 41. Each substrate 11 may be made of solid, porous or perforated material made from silica, graphite, silicon carbide, ceramic, metal, metal alloys or combinations thereof. It may have round, rectangular or any other cross section. It may be tubular, solid or tubular with solid or tubular core made from the same or other material. The cross-sections of the substrates may be the same throughout the preforms or may vary in certain controlled manners to obtain silica members of desired shapes or sizes. The ends 45 may have the same cross section throughout, or the ends may have different dimensions or shapes. The ends 45 may be mechanically connected to the substrate 11 or they may be part of the substrate. A gas line 47 or vacuum line may be connected with the hollow portion of each substrate having tubular shape, with or without a central rod.

FIG. 4 shows an apparatus consisting of a vacuum chamber 51 having a plurality pressure controls in the form of vacuum ports 53, vent lines 55, and gas ports 57 doping ports 59 for purging and doping purposes, plurality of power feedthroughs 61 with or without cooling lines 63 in them for resistive, RF 65 or any other form of heating the substrate 11 of the preform 41 and the preform itself. The chamber may have multiple heating zones 67 to accommodate the process being performed there. Rotation and translation assembly mechanisms 60 rotate 62 and translate 64 the substrate 11 and preform 41. Slip rings 66 conduct power from source 68 to heat the substrate 11.

In FIG. 4 the dopant gases 58 surround the preform 41, and purge or dopant gases 56 from purge or dopant line 54 flow outward from the porous substrate through the porous preform 41.

Figure 5:
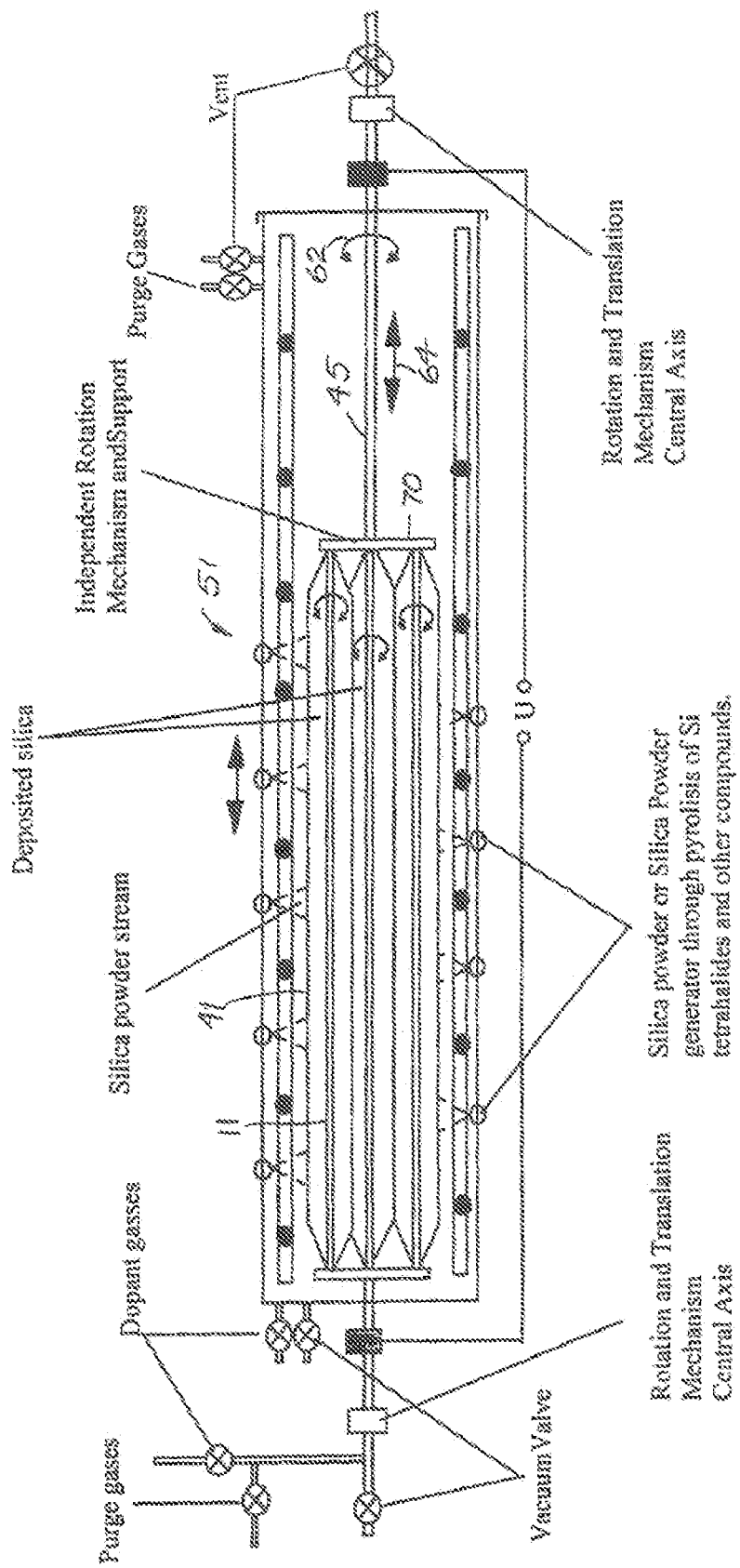
FIG. 5 show multiple preforms with rotation and translation in the silica powder streams in the chamber.

In FIG. 5 chamber 51 has three growing preforms 41 mounted on substrates 11, which are mounted on independent rotation mechanisms or multiple rotators 70, which rotate the preforms with respect to each other as the support ends 45 rotate 62 and translate 64 mechanisms 70.

Figure 6:
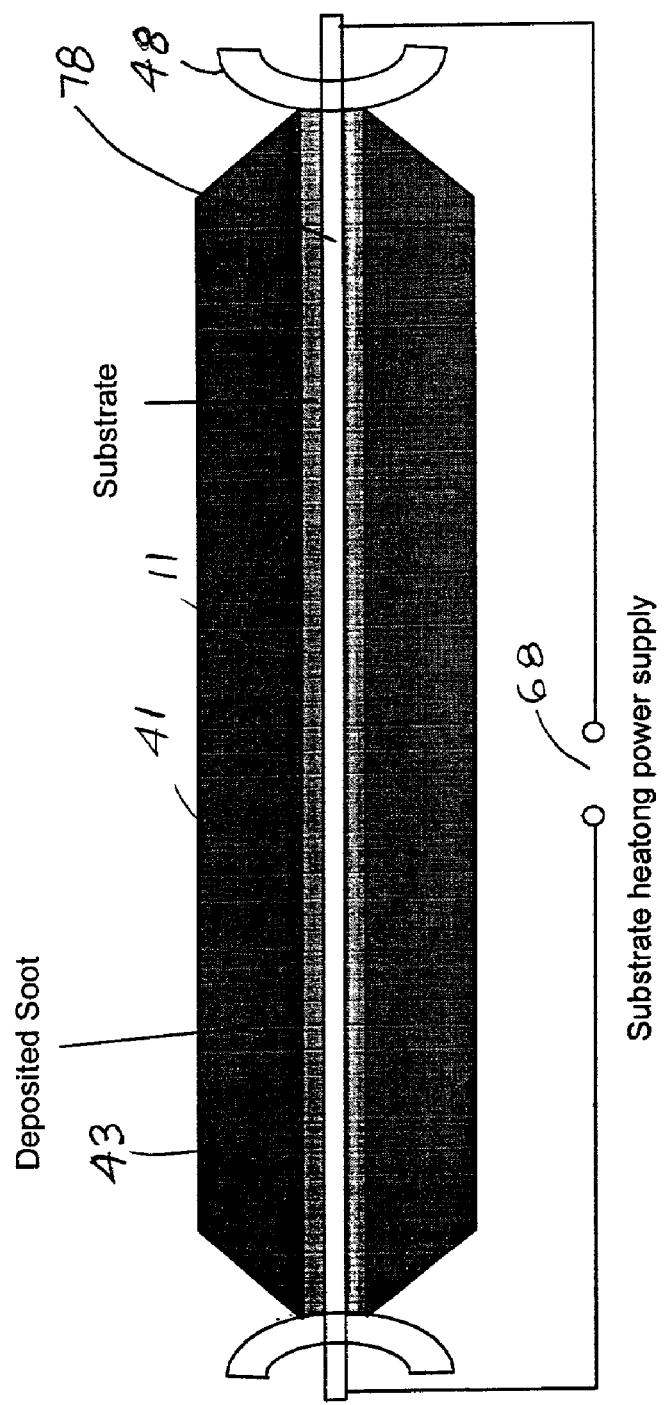
FIG. 6 shows a heated substrate and fused silica preform.

FIG. 6 shows a preform 41 on a substrate 11 with the deposited soot 43 and an end attachment 48. Heating element 78 connected to power source 68 heats the substrate 11 for controlled temperature deposition on the preform 41.

Figure 7:
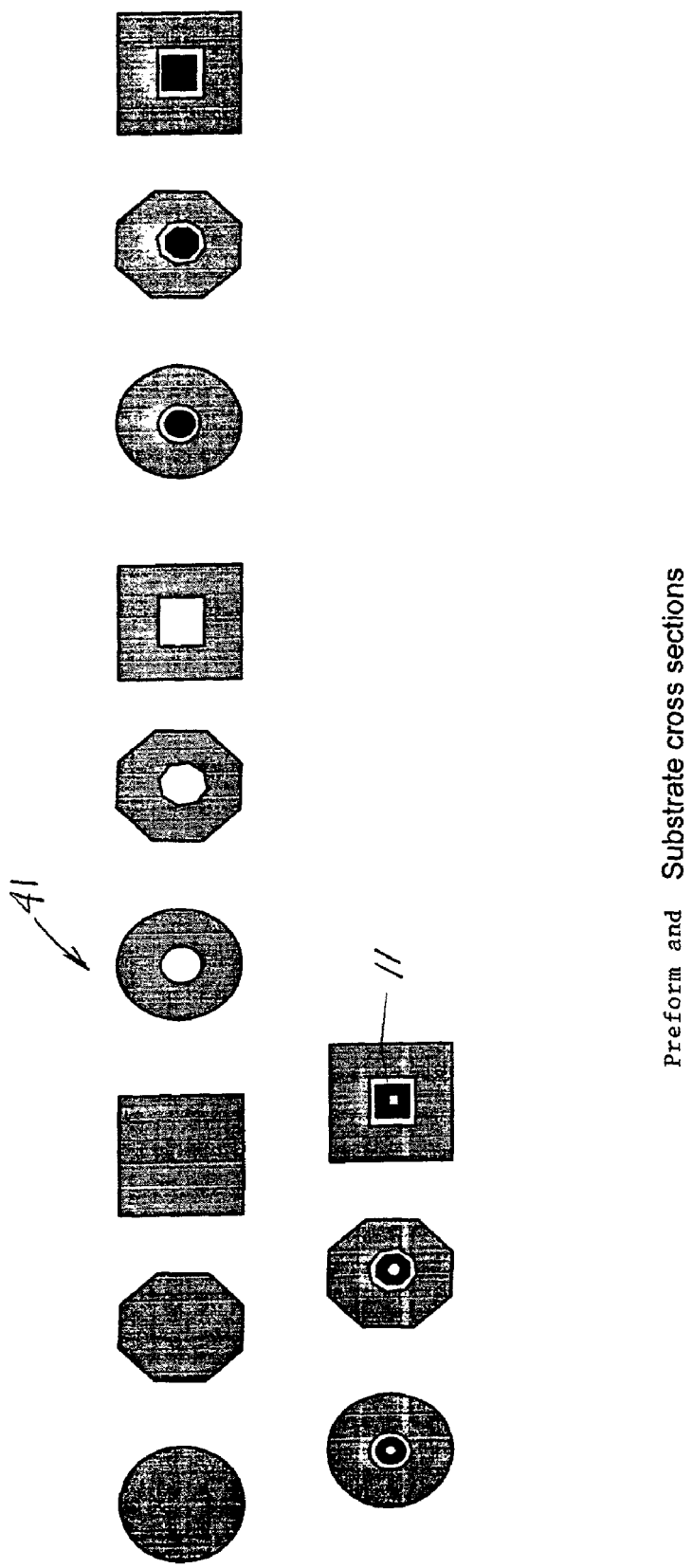
FIG. 7 shows several different cross-sections of preforms and substrates with heating and gas delivery elements.

As shown in FIG. 7, preforms 41 and substrates may have any specific shapes such as solid or tubular with round polygonal or square preforms and substrates with solid or hollow substrates, and they may employ solid, porous or tubular heating elements 78.

Figure 8:
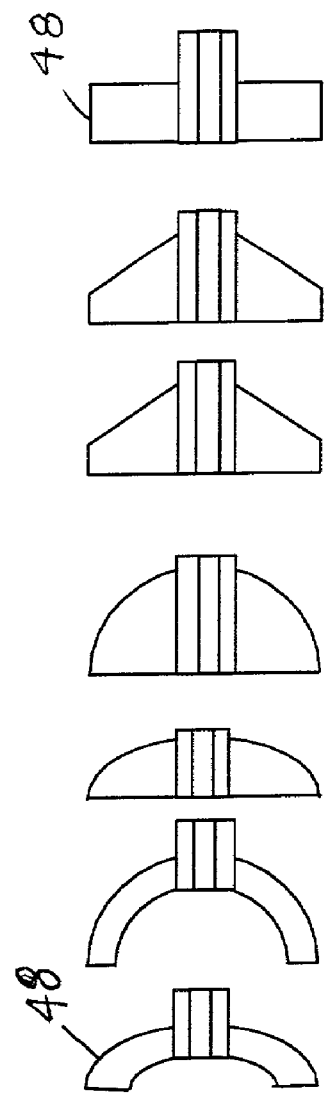
FIG. 8 shows several different substrate end attachments of FIG. 7 in further powder streams and forming a cladding layer.

FIG. 8 shows several preferred end attachments 48 for substrates. The end attachments may be pinned, threaded or shrunk on the substrates, or they may be part of the substrate.

When the substrate is fused silica, the tube is ready to be used or ready to be softened and to be compacted and densified into a solid. When the substrate has desired core properties, the fused silica member may be transformed into fiber optic preform ready for fiber fabrication.

FIGS. 9A and 9B show a vitrified silica tube 90 on a heated substrate 11 and after removal from the substrate.

The substrate 11 may be heated, and the fused silica tube 90 may be slid off the substrate after a film is melted adjacent the substrate, after the end attachments 48 are removed.

The tubing 90 that is removed has a hole 93 and a tube wall 95, as shown in FIG. 9A. It may be compressed into a solid doped or undoped fused silica rod.

Figure 10:
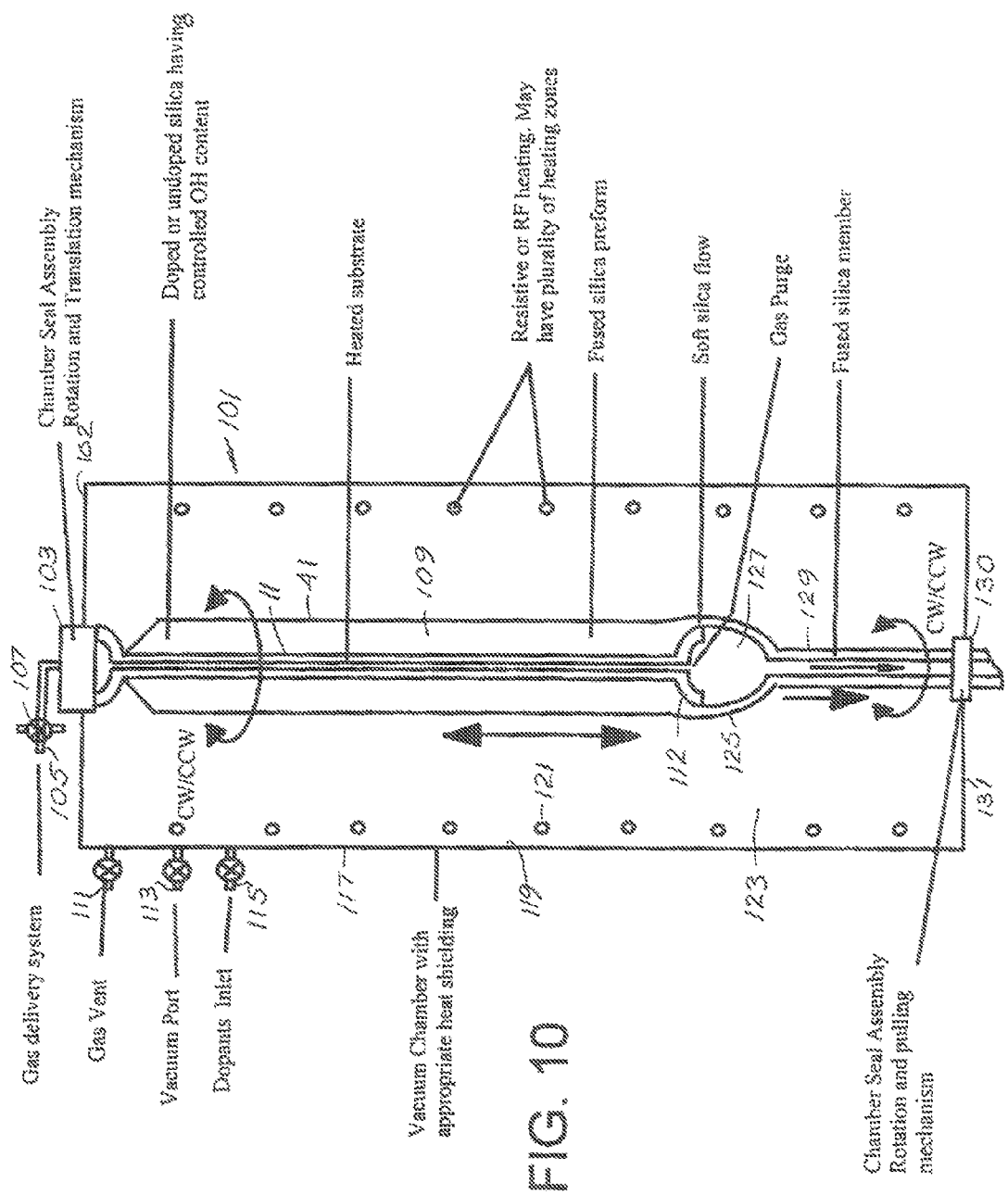
FIG. 10 is a cross-sectional vertical view of forming a fused silica tubular or solid preform member, which is formed as pulled from a melted porous or vitrified preform in a tubular preform forming chamber.

In FIG. 10 a vacuum chamber 101 is oriented vertically. A preform 41 is supported vertically on its substrate 11 which has generally hemispherical ends 112. The preform 41 may be supported by the substrate rod itself, if the rod substrate cross-section is varied. A chamber seal and gas delivery assembly at the top 102 of the chamber has a rotation 104 and translation 106 mechanism 103. A gas delivery system 105 with a valve 107 supplies purging or dopant gas to the hollow porous substrate. The preform is doped or undoped silica 109 having a controlled OH content. The chamber has a plurality of valved gas vents 111, valved vacuum ports 113, and valved dopant inlets 115. Walls 117 of the chamber have appropriate heat shielding 119 and jacket cooling. Resistive or RF heating elements 121 provided in a plurality of heating zones 123 soften the silica, which flows 125. The moving silica flows around end 112 of substrate 11 as purge gas 127 flows. The resultant fused silica member, in this case tube 129, is rotated and pulled by mechanism 130 at the bottom 131 of the chamber 101.

Figure 11:
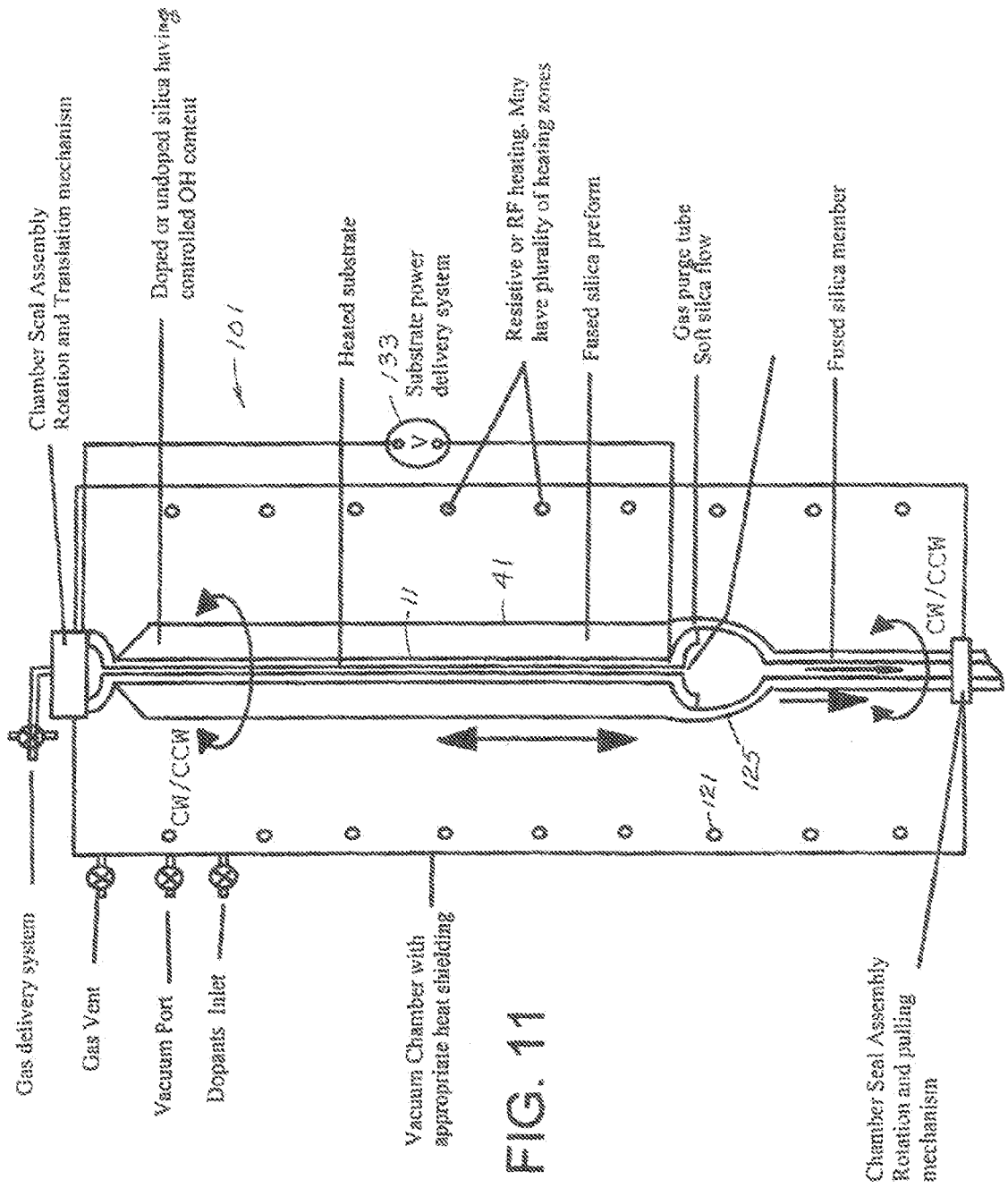
FIG. 11 shows a tube-forming chamber with a substrate heater.

FIG. 11 is similar to FIG. 10. A substrate power system 133 is added to heat the substrate 11 and to assist the heating elements 121.

Figure 12:
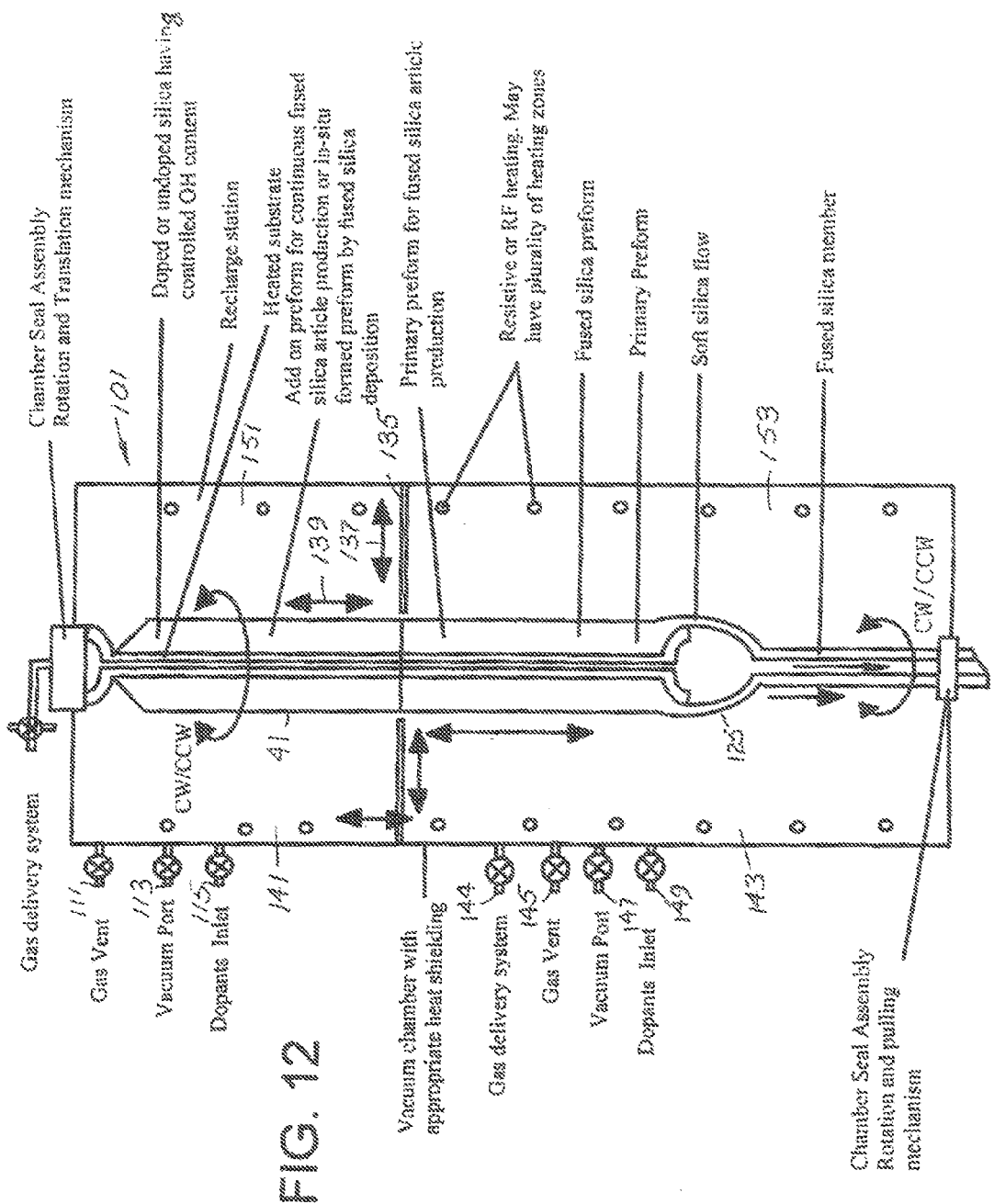
FIG. 12 shows a tubular preform-forming chamber, such as shown in FIG. 10, with a recharging station for adding a preform for continuous article production.

FIG. 12 has a chamber 101 similar to the chambers shown in FIG. 10.

A movable shelf 135 may move inward and outward 137 and up and down 139 to control doping, heating and softening of the preform 41, and to separate the chamber 101 into two chambers 141 and 143. Lower chamber 143 has a separate set of valved ports 144, 145, 147, 149 which precisely control the conditions in the lower chamber 141. The shelf 135 divides the chamber 101 into separate heat zones 151, 153. In addition, heat outputs of heating elements 121 may be varied to create additional heat zones within zones 151 and 153.

Figure 13:
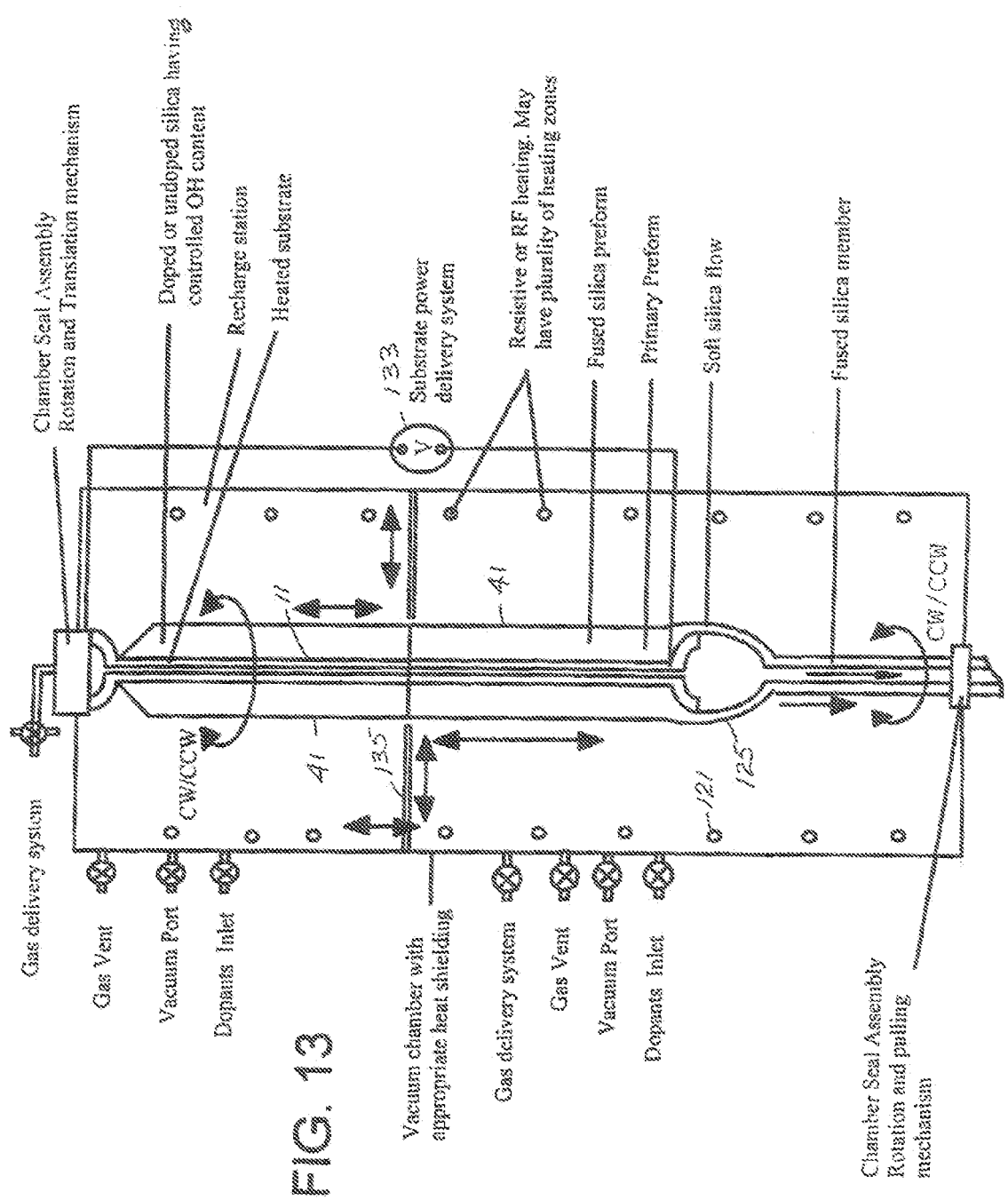
FIG. 13 shows a chamber similar to that shown in FIG. 12 with a substrate resistance heater.

In FIG. 13 a substrate power delivery system 133 is added to control precise heating on the substrate 11. The heating elements 121 in the lower heat zone melt and flow 125 the soft silica from the lower preform. When silica is depleted from the lower preform, heat is increased on the substrate 11 to soften the inner layer of silica, and the upper part of the preform slides downward. A new preform can be added above shelf 135, either via a door not shown here or through the chamber seal assembly.

Figure 14:
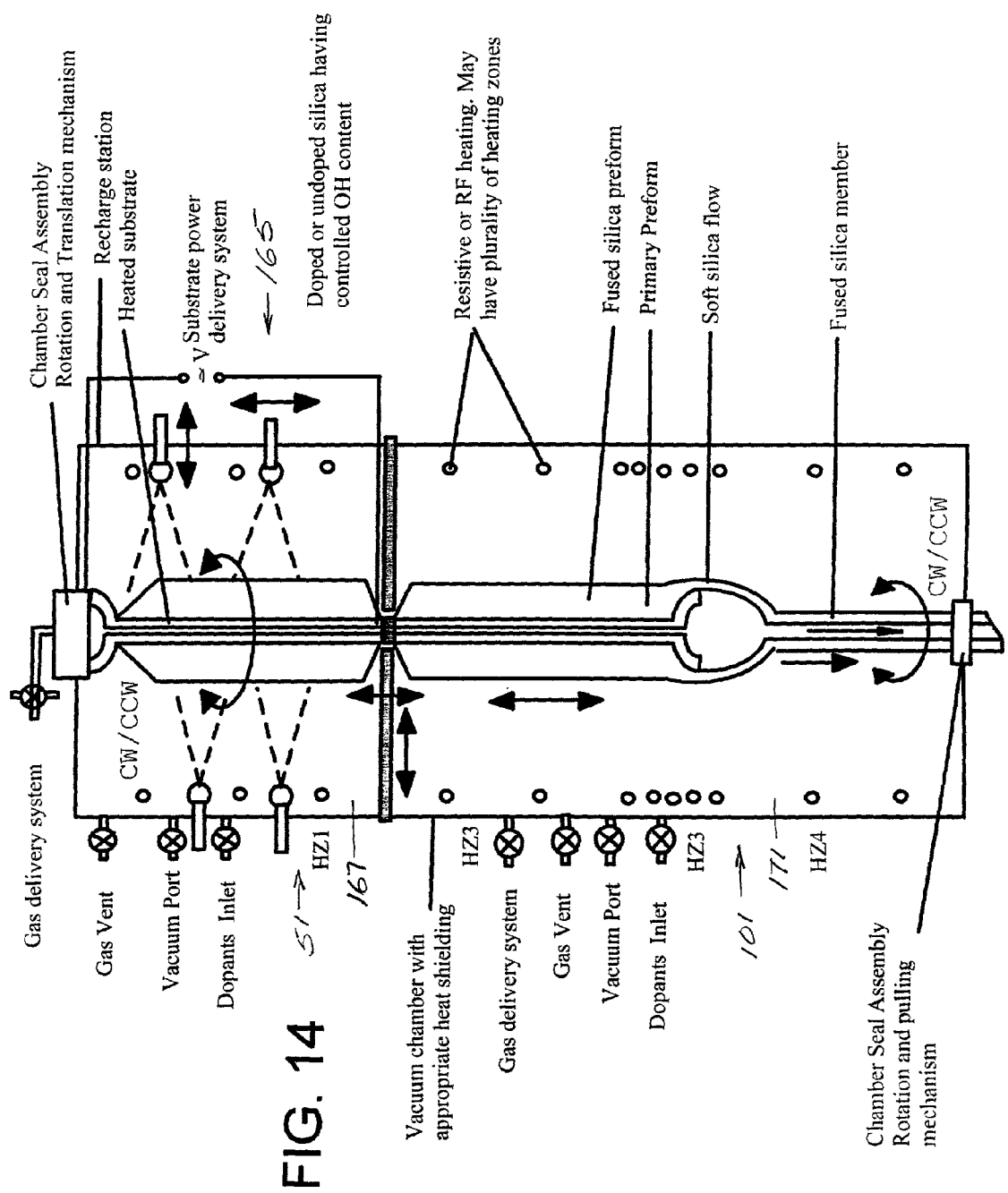
FIG. 14 shows a single unit in which the porous preform is generated around a vertical porous or non porous deposition substrate. Silica stream generators, which are burners or powder delivery units, are connected for vertical and radial movements to ensure the desired distance and flow from the growing porous preform. The cylindrical porous preform is transferred to the lower fused silica tubular preform-forming chamber by opening the retractable shield and heating the deposition substrate with radio frequency heating, so that the center of the porous preform can be softened to allow the preform to slide down the deposition tube when ready. In the fused silica preform forming section, rotation is maintained under controlled heating, and the fused silica tube is pulled from the porous preform.

FIG. 14 shows the vacuum chamber 165, which combines a vertically oriented chamber 51 such as shown in FIG. 4 used for continuous production of glass material with a fused silica member-forming chamber 101. After the necessary material preparation steps have been made appropriate pressure and atmosphere is introduced for the glass fabrication process, tubular or solid glass material having the desired cross sectional shape is made in the upper chamber 167. The burners 3 or material feeders 37 feed material 73 as well as the glass preform 41 being made can rotate 62. A retractable shelf holder 169 is placed under the growing refill preform 41 to prevent distractions in the tube formation process in lower chamber 171. The preforms 41 might be used as produced or they may be dried, doped and densified before the fabrication of the fused silica fabrication process begins. Heat zones HZ1, HZ2, HZ3 and HZ4 control desired temperatures in chamber 165.

FIG. 14 shows process and apparatus for continuous fabrication of fused silica glass having either tubular, solid rod having the desired cross sections. The vacuum chamber 165 may constitute a plurality of interconnected chambers similar to chamber 51 and 101. It also may be connected with a chamber for fused silica plate or bar production. Provisions for resistive, RF or any other heating of the substrate and the preform have been included. Multiple independently controlled heating zones HZ1-HZ4 are used.

The upper chamber 167 serves for fabrication of the preform. The preform is later moved down to chamber 171 and used for continuous fabrication of fused silica glass in either tubular or solid rod form having the desired cross sections. Resistive or RF heating is used to decouple the preforms from the substrates, if needed.

Figure 15:
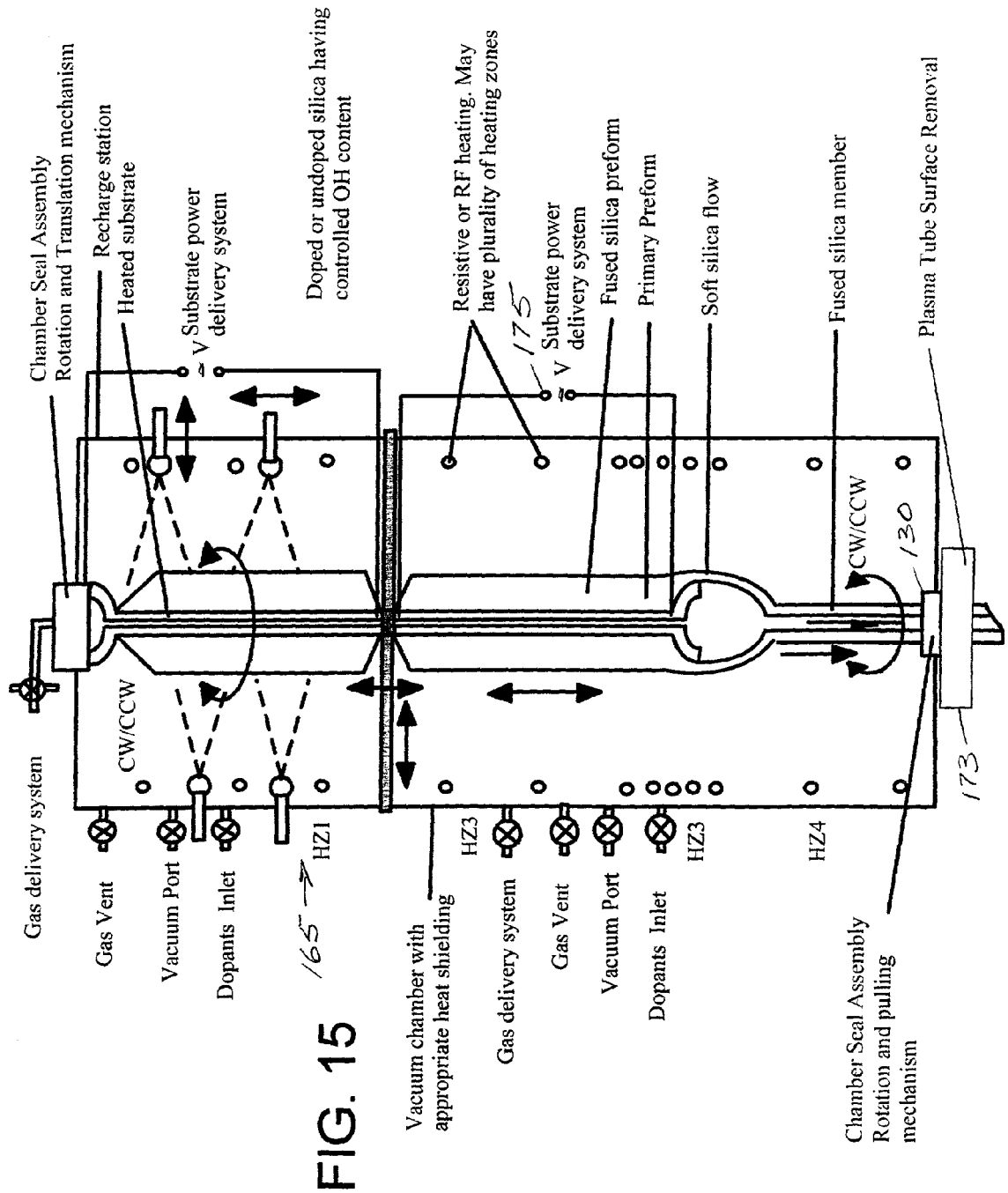
FIG. 15 shows chambers similar to those shown in FIG. 14 with a substrate power delivery system in the lower chamber.

FIG. 15 shows a chamber 165 similar to that shown in FIG. 14. A plasma tube and/or fused silica member surface removal unit 173 is added either above or below the rotating and pulling mechanism 130. A separate substrate heater 175 is added in the lower fabrication chamber.

Figure 16:
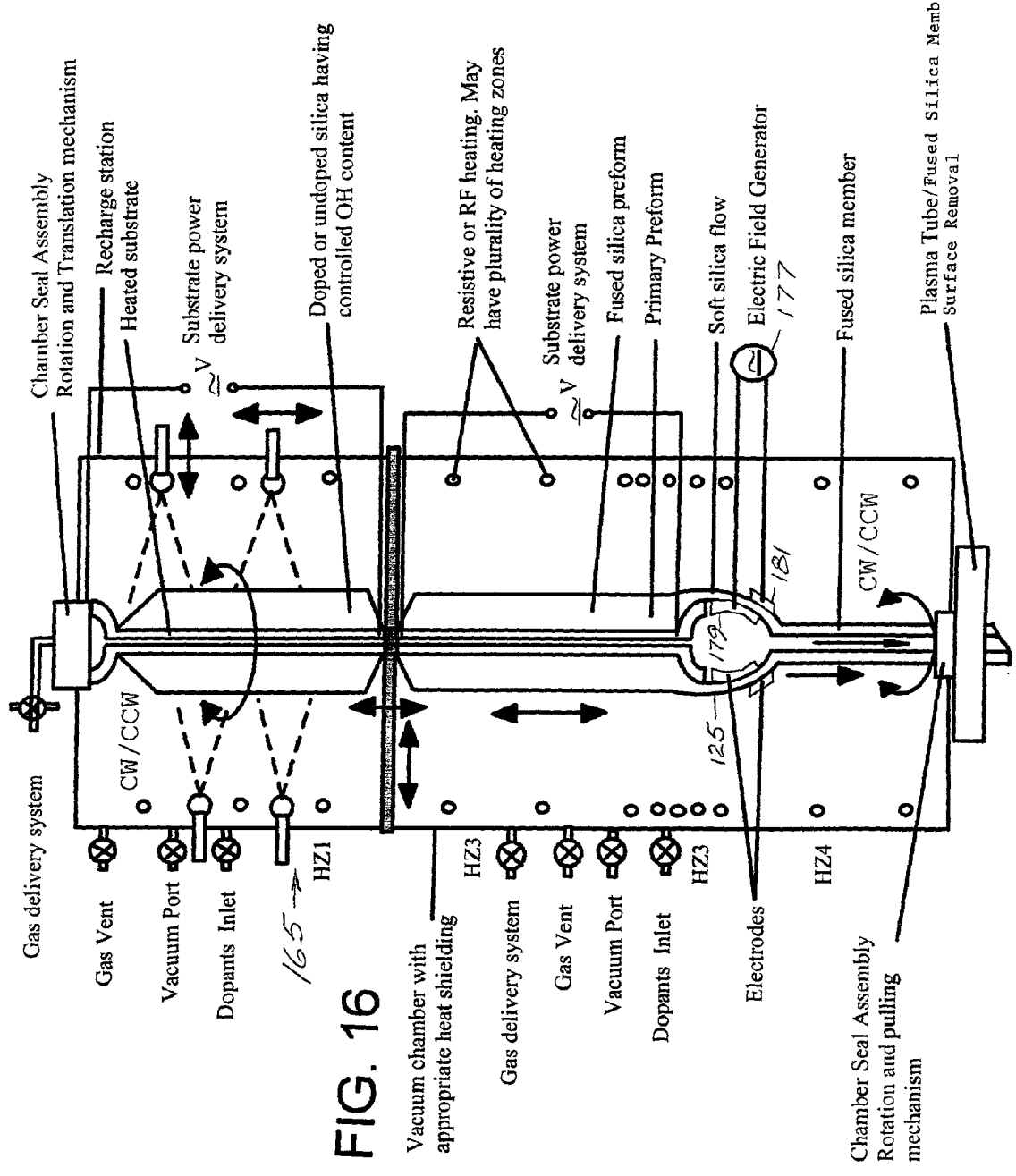
FIG. 16 shows chambers similar to those shown in FIG. 15 with an electric field generator for further purification of the soft silica.

FIG. 16 is similar to FIG. 15. An electric field generator 177 with electrodes 179 and 181 is added to create an electric field across the silica flow 125. Fused silica feed is softened and shaped therein. An ultrapure clear, bubble free tube, plate or bar is extracted from the chamber. Plasma process unit 177 removes unwanted impurities segregated on the surface layer by the electric field.

Figure 17:
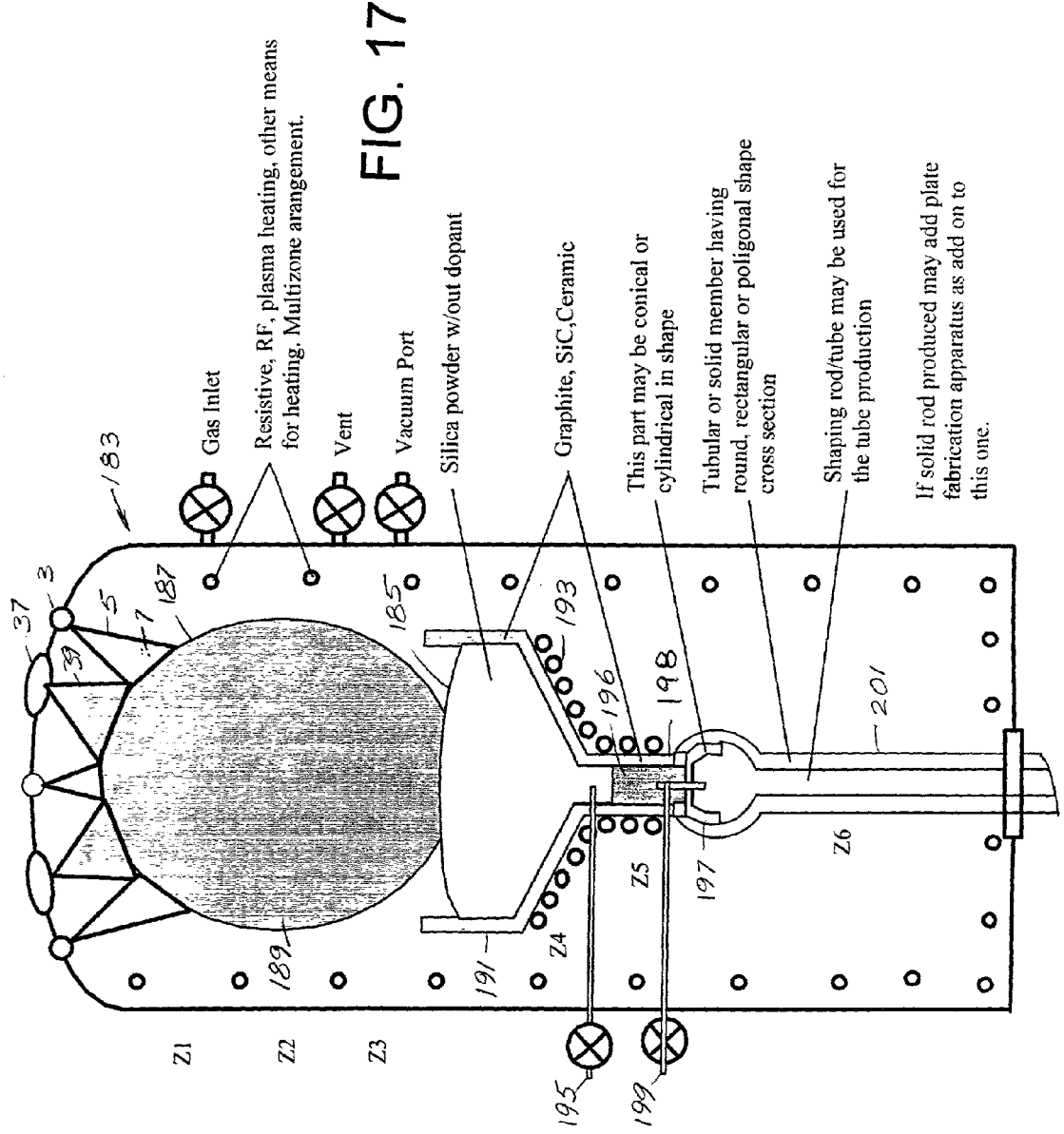
FIG. 17 shows a chamber with multiple heating zones for creating and melting soot and drawing a rod or tube from the melted soot.

FIG. 17 shows a chamber 183 for producing silica power 185 and other metal oxides from soot 187 having desired particle size. Fine oxide particles from generators such as in situ made from burners 3 or delivered through plurality of ports 37 on the chamber are heated in mass 189 and allowed to recombine. Depending on the time they stay hot and the distance the particles travel, they recombine into larger grains of desired size. Plasma plating using single or multiple stage plasma of the silica particles may be employed. The vacuum chamber 183 has multizone heating zones Z1-Z6. Resistive heating, RF heating, plasma or other heating methods of the grains may be employed.

The soot is collected in a crucible collector 191 with a heater 193 and a gas/dopant gas injector 195, as shown in FIG. 17. It may be softened 196 in a heated throat 198, funneled and flowed around a former 197 and filled/purged with gas 199 to form a tube 21 into chamber 203.

Figure 18:
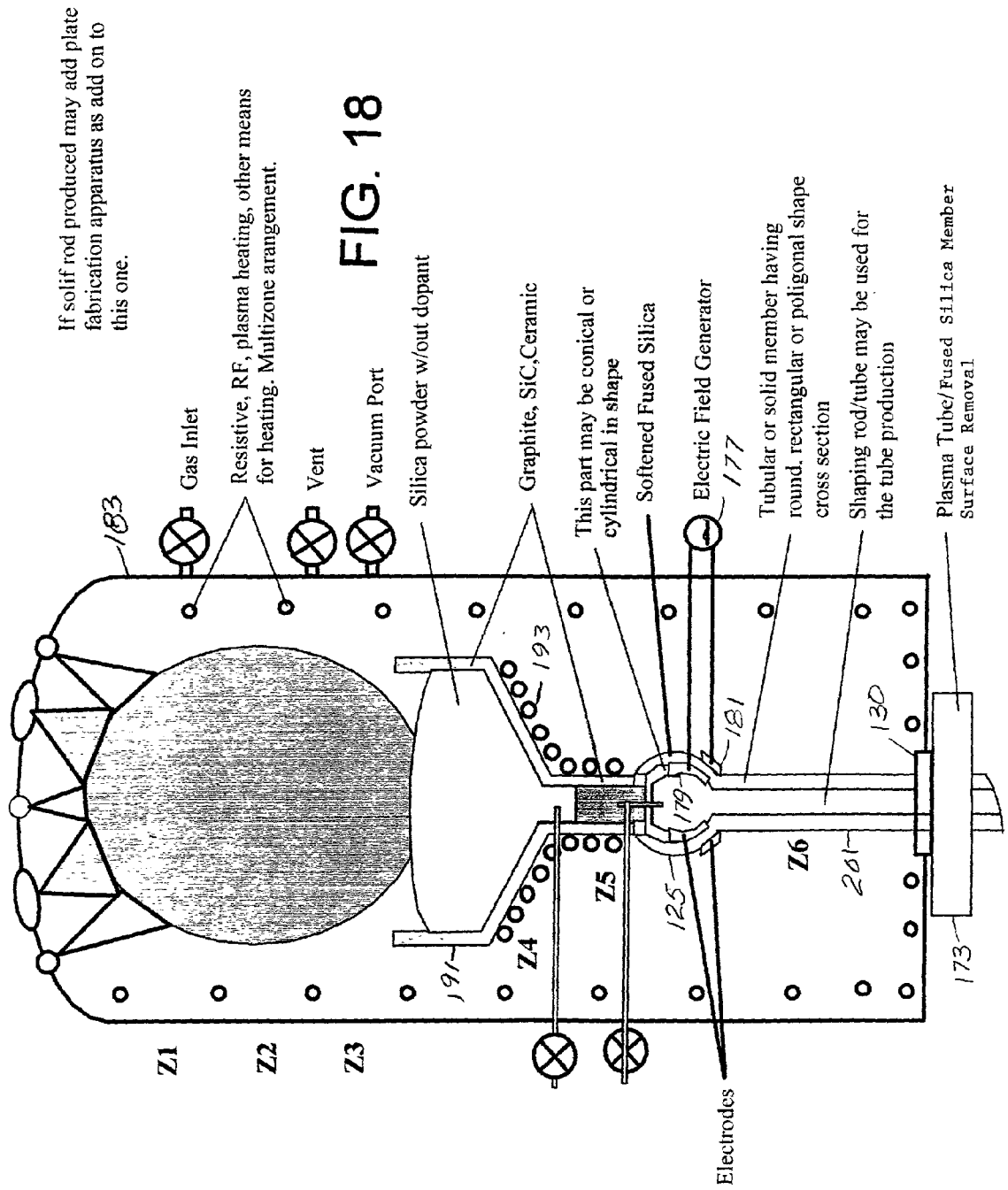
FIG. 18 shows a chamber similar to that shown in FIG. 17 with an electric field generator for unwanted impurities removal and plasma tube surface removal of the same impurities and other surface elements.

Another chamber employing the new soot grain enlargement process for tube or rod fabrication is as shown in FIG. 18. In that embodiment, electric field generator 177 and electrodes 179 and 181 provide an electric field across the softened fused silica flow 125. A plasma tube or fused silica member surface removal unit 173 is added in the embodiment.

Figure 19:
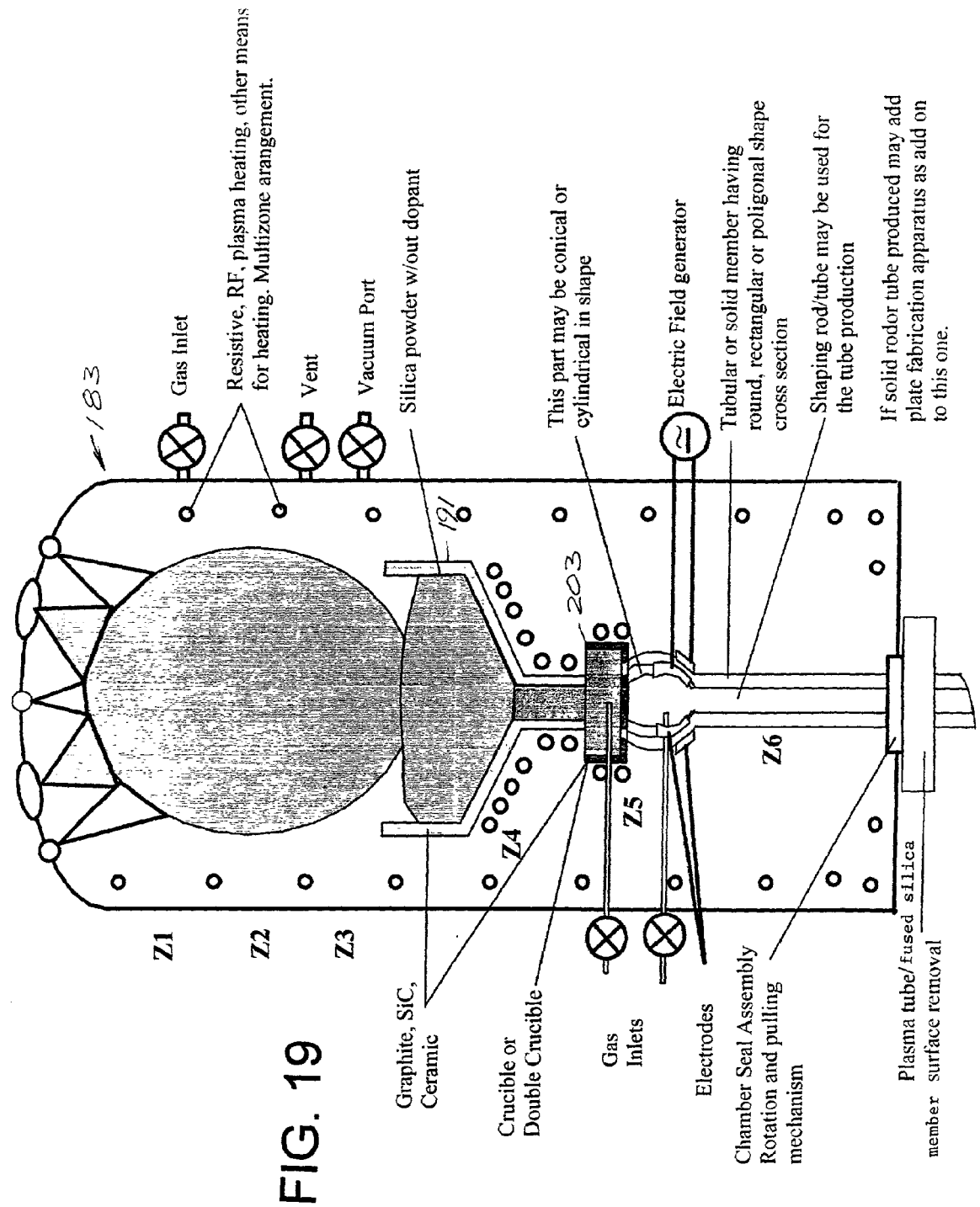
FIG. 19 shows a chamber similar to that shown in FIG. 19 with an electric field generator and a plasma tube surface removal unit with gas introduction or withdrawal within the formed tube and with a double crucible with gas introduced in the second crucible.

FIG. 19 shows a single or double crucible 203 in the chamber. A vacuum chamber 183 having plurality of vacuum ports, gas inlet ports, vent ports, and a fused silica feed material introduction port is heated by resistance or RF heating or any other means of heating, connected through plurality of feedthroughs. A second crucible 203 made from graphite, silicon carbide, ceramic material, metal, metal alloys or combinations thereof receives the material from the feed crucible 191. A fused silica tube is produced. Pluralities of ultrasound generators are in contact with the crucible to provide proper mixing and outgassing. Additional vacuum ports are placed above the softened material to remove any gas bubbles. The chamber can be a single chamber or plurality of chambers.

Figure 20:
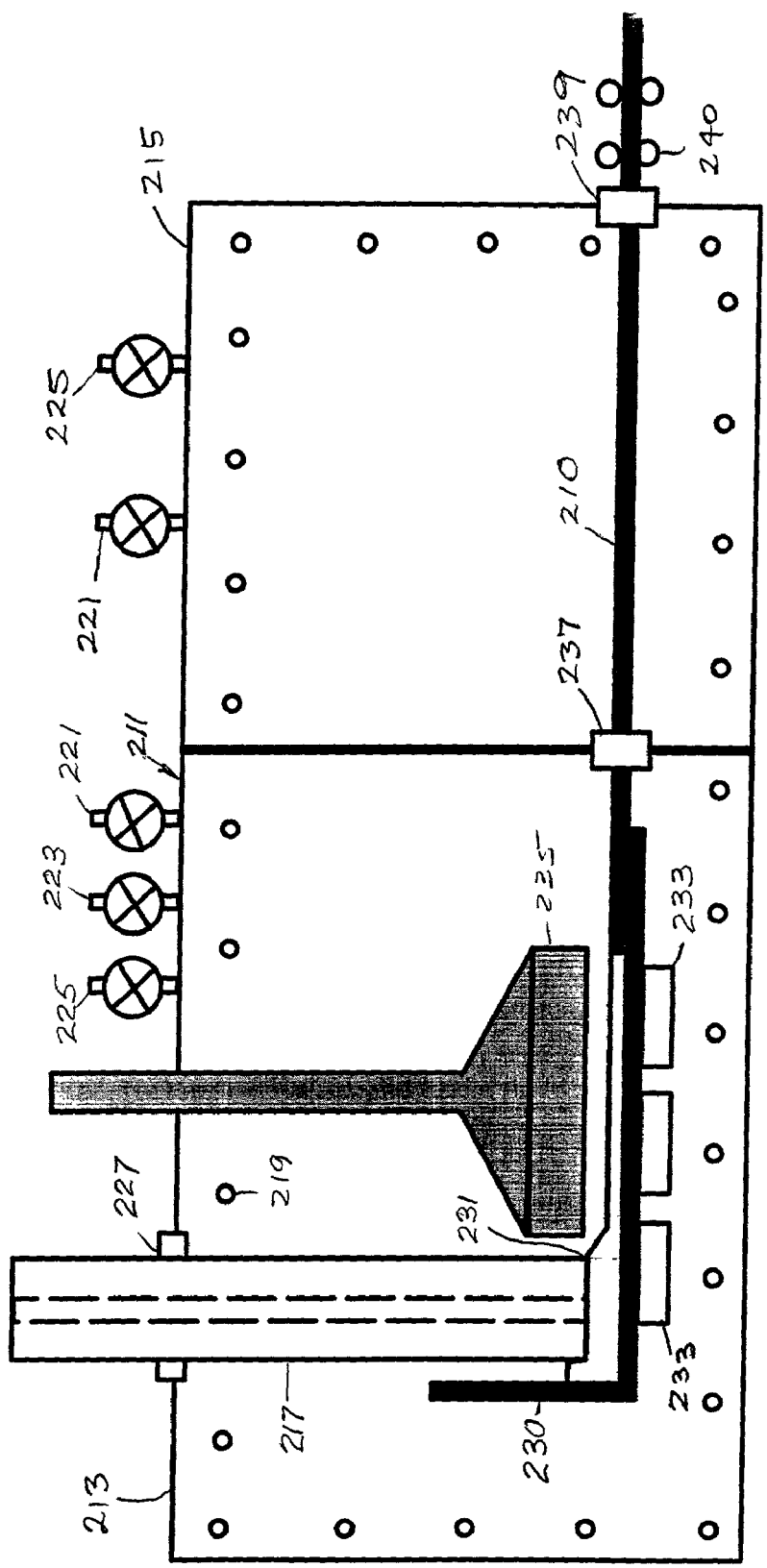
FIG. 20 shows formation of a plate or sheet from a fused and vitrified silica tube-like preform.

FIG. 20 shows apparatus for plate or any other fused silica member production.

Figure 21:
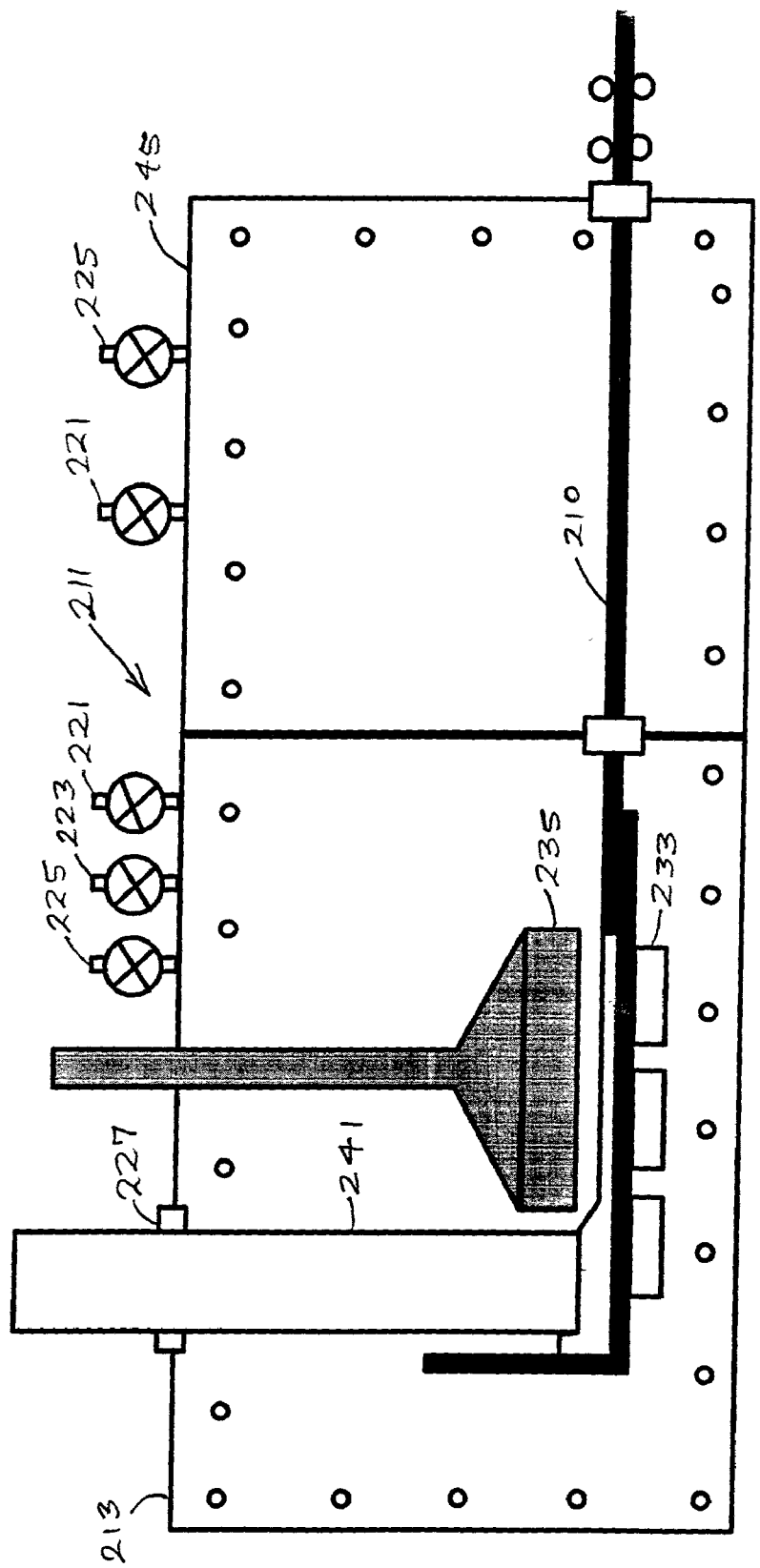
FIG. 21 shows formation of a plate or sheet from a fused and vitrified silica rod-like preform.
Figure 22:
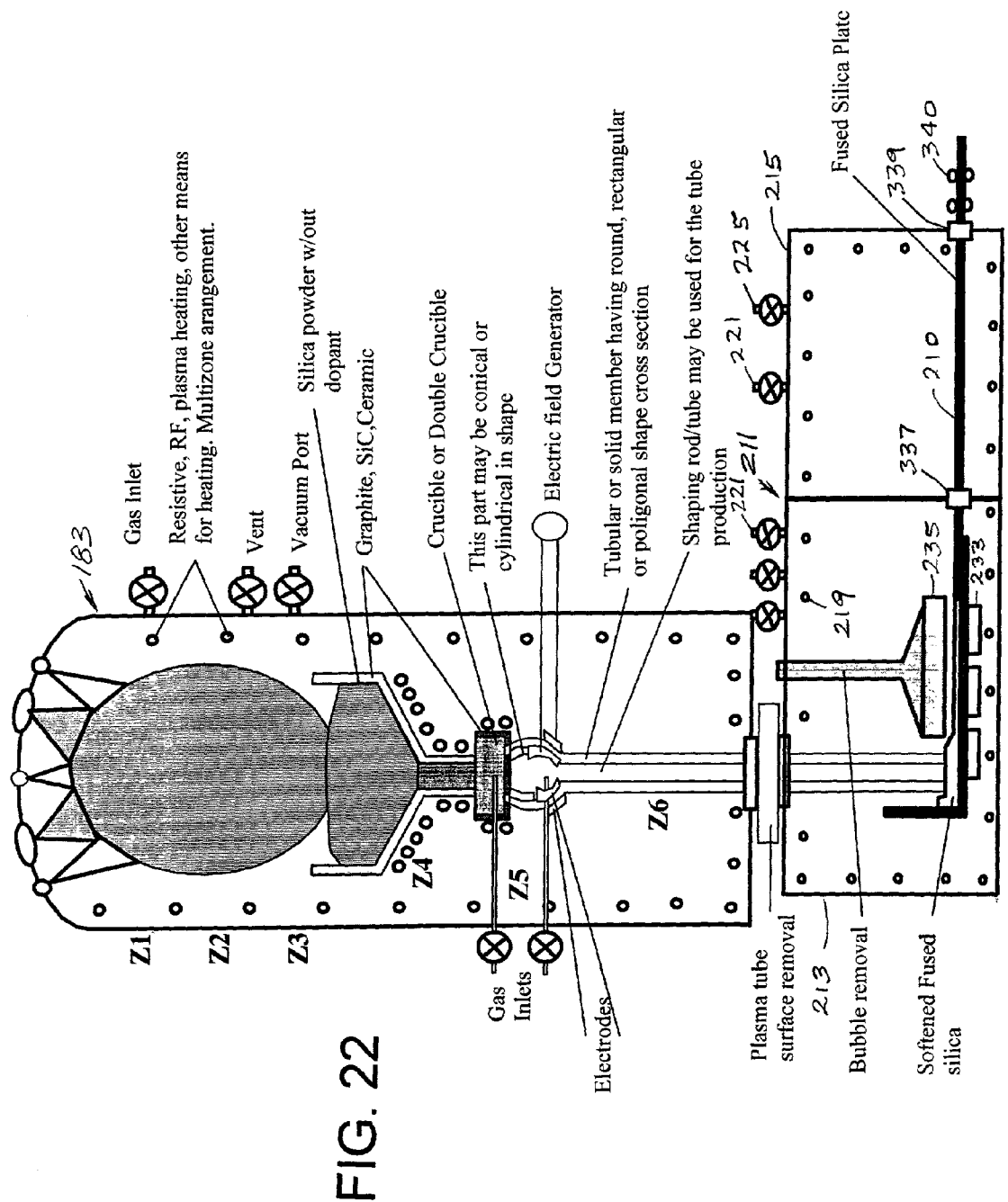
FIG. 22 shows a combined system of FIG. 19 and FIG. 20 for continuous production of high quality plate or shaped type silica members.

FIGS. 21 and 22 show forming a fused silica member 210 in a vacuum chamber 211, which has two sections 213 and 215. In FIG. 21, a softened fused silica tube 217 is fed into chamber section 213. Heaters 219 around the chamber maintain required heat. In chamber section 213 a relatively high heat is maintained for flowing the softened fused silica into the desired form. A lower heat is maintained in chamber section 215 in which the fused silica form further solidifies.

FIG. 20 shows a plate/bar fabrication chamber 211. A vacuum chamber section 213 having plurality of valved vacuum ports 221, gas inlet ports 223, vent ports 225 and a fused silica feed material 217 introduction port 227 is heated by resistance of RF heating 219 or any other means of heating, connected through a plurality of feedthroughs. A crucible 230 made from graphite, silicon carbide, ceramic material, metal or metal alloys receives the material 231 from the feed tube 217, softens, dopes, degassifies and solidifies the material. A fused silica plate or a bar 210 is produced. A plurality of ultrasound generators 233 are in contact with the crucible to provide proper mixing and outgassing. Additional vacuum ports 235 are placed above the softened material to remove any gas bubbles. The chamber can be a single chamber or plurality of chambers 213, 215 with sequentially controlled heat zones. The shaped member 210 exits the chambers through pressure and heat seals 237 and 239. Rollers 240 pull the shaped member out of the chambers.

FIG. 21 shows a plate or bar forming chamber 211 similar to that sown in FIG. 20, in which the infeed is a solid rod 241.

FIG. 22 shows a fused silica plate, bar or otherwise shaped member 210 forming chamber 211 directly coupled to chamber 183, such as shown in FIG. 19, for receiving the fused silica tube input directly from the output of chamber 183.

The heating of the substrate may be accomplished by separate heaters positioned axially along or in the substrate. Alternatively if resistance heating is used, the heating wire may be varied in shape, form or size along the length of the substrate. The substrate may be linear or planar and may be made in one element or plural elements. A singe control or multiple independent controls may be used. The varied heating of the substrate may be used to effect uniformity of the preform in an axial direction. Alternatively the varied heating may be used to effect varied densities or porosities of the perform along it's length or per unit area.

EXAMPLES

Silica Glass Body Fabrication

Production of synthetic fused silica glass bodies having controlled density and desired size and shape have been of interest to the natural quartz or synthetic fused silica glass industry for some time. The densities of the formed silica body mainly depend on the temperature of the flame, the distance between the substrate and the burner, and rotational and translational speeds of the substrate. Densities between 10% and 30% have been reported by this approach. The size of the body and the optimal ratio between the wall thickness ($W_t$) and the outside diameter ($D_o$), $W_t/D_o$, as well as the ratio between the outside diameter ($D_o$) and the Inside diameter ($D_i$), $D_o/D_i$, and the way the body is held during the deposition depend greatly on the density of the body surface temperature and the body density.

To overcome the current limitations and to produce large glass bodies made from synthetic fused silica, natural quartz or combination thereof, substrate heating and surface heating has been introduced. The amount of the surface heating will greatly depend on the substrate temperature, the chamber pressure, the size of the quartz particles and their temperature at impact of the surface and the size of the quartz member fabricated. Silica preforms, doped or undoped, having desired density and optimized diameter ratio can be fabricated following the examples shown below.

Example No. 1

Silica Body Fabrication

A heated substrate having temperature of about 1000°-1400° C. is subjected to plurality of silica particle stream either generated in situ by high temperature reactions of silica precursors, or fabricated in a separate process and then introduced via ports on the chamber in pure form, doped form, mixed with neutral gas, gas plasma or combination thereof. The so accelerated particles collide with the substrate and deposit themselves on the substrate. Subsequent particles deposit on the material already deposited, and layer by layer the silica member is formed. The silica particle stream may be doped or undoped. The temperature of the substrate might be sufficient to keep the surface of the so formed body at the same temperature. The silica body so formed is hot enough to allow for formation of a solid fused silica body. Densities between 80% and 100% may be expected as a result.

The substrate may be tubular or solid form having the desired diameter and cross section. Desired ratios between the outside and inside diameters may be obtained using this method. If tubular, the substrate may be solid or porous, depending on the dopant or reactive gas flow desired. This achieves optimized silica material-to-gas contact. The hot substrate may also serve as a heater for the dopant gas and increased reaction time. Porous substrates can also diminish the possibility of gas bubbles entrapment near the surface of the substrate.

Substrate and surface temperatures between about 700° C. and 1600° C. may result in various silica densities from 10% to 100%. Controlling the fused silica body temperature by controlling the substrate and surface temperature may result in control of the pore size and pore density in the material. If the variation is in the radial direction, exposure to dopant gas over periods of time will result in radial gradient of the dopant distribution. By doing so silica members having radially graded indexes of refraction may be fabricated.

If the substrate is other than a silica core, doped or undoped made from fused silica or natural quartz; the resulting silica member may be in tubular form or may be in solid form after collapsing the tube.

Employing non uniform substrate heating along the length of the body, one may obtain a silica member having variable density over its length.

Example No. 2

Doped and Undoped Layer Combination Silica Body Fabrication

Step 1.

Rotating and translating, a substrate consisting of porous tubing is heated to a temperature of about 1300° C. and is subjected to plurality of silica particle stream introduced via ports on the chamber. The accelerated particles collide with the substrate and deposit themselves on the substrate. Subsequent particles deposit on the material already deposited, and layer by layer the silica member is formed. A porous silica body having about 25-35% solid glass density is obtained by this process.

Step 2.

Introducing silicon tetra fluoride, $SiF_4$, through the porous substrate and/or the chamber into the deposited porous silica material for about 0.3 to 6 hours at temperature of about 800-1400° C., the silica material is doped.

Step 3.

The substrate and/or chamber temperature is raised to about 1400-1600° C. while rotating the substrate. A vitrified tubular silica body having desired wall thickness is formed.

Step 4.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 5.

The substrate and/or chamber temperature is raised to about 1400-1600° C. while rotating the substrate. The newly deposited porous silica is vitrified, and a tubular silica body having desired doped inner wall thickness $IW_t$ and undoped other wall $OW_t$ desired wall thickness is formed. The duration of the silica deposition for certain substrate cross sections and sizes can be adjusted to allow for various ratios between the wall thicknesses of the doped and undoped portion of the tubular member, e.g., 1:2, 1:3, 1:5, etc.

Example No. 3

Doped Non-Porous and Undoped Porous Layer Combination Silica Body Fabrication Step 1.

Rotating and translating, a substrate consisting of porous tubing is heated to a temperature of about 1300° C. and is subjected to plurality of silica particle stream introduced via ports on the chamber. The accelerated particles collide with the substrate and deposit themselves on the substrate. Subsequent particles deposit on the material already deposited, and layer by layer the silica member is formed. A porous silica body having about 25-35% solid glass density is obtained by this process.

Step 2.

Introducing silicon tetra fluoride, $SiF_4$, through the porous substrate and/or the chamber into the deposited porous silica material for about 0.3-6 hours at temperature of about 800-1400° C., the silica material is doped.

Step 3.

The substrate and/or chamber temperature is raised to about 1400-1600° C. while rotating the substrate. A vitrified tubular silica body having desired wall thickness is formed.

Step 4.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process. The duration of the silica deposition for certain substrate cross sections and sizes can be adjusted to allow for various ratios between the wall thicknesses of the doped and undoped portion of the tubular member, e.g., 1:2, 1:3, 1:5, etc.

Example No. 4

Undoped Core and Fluorine Doped Cladding Fiber Optic Preform Fabrication

Step 1.

Rotating and translating, a substrate consisting of porous tubing is heated to a temperature of about 1300° C. and is subjected to plurality of silica particle stream introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 4.

Introducing silicon tetra fluoride, $SiF_4$, through the porous substrate and/or the chamber into the deposited porous silica material for about 0.3-6 hours at temperature of about 800-1400° C., the silica material is doped.

Step 5.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 6.

The substrate is transferred out of the deposition chamber area, and the substrate is removed. If wetting between the substrate and silica occurs, the substrate is heated to the softening point of the silica. The contact between the substrate and the silica member is melted and the substrate is removed.

Step 7.

The so formed silica member is collapsed and a solid rod like silica member is formed. Undoped core (high index of refraction material) surrounded by fluorine doped cladding (low index of refraction material) having desired diameter and length is formed. The duration of the silica deposition for certain substrate cross sections and sizes can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length.

Example No. 5

Doped Core and Fluorine Doped Cladding Fiber Optic Preform Fabrication

Step 1.

Rotating and translating, a substrate consisting of porous tubing is heated to a temperature of about 1300° C. and is subjected to plurality of silica and dopant particle stream introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 4.

Introducing silicon tetra fluoride, $SiF_4$, through the porous substrate and/or the chamber into the deposited porous silica material for about 0.3-6 hours at temperature of about 800-1400° C., the silica material is doped.

Step 5.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 6.

The substrate is transferred out of the deposition chamber area and the substrate is removed. If wetting between the substrate and silica occurs, the substrate is heated to the softening point of the silica. The contact between the substrate and the silica member is melted, and the substrate is removed.

Step 7.

The so formed silica member is collapsed and a solid rod like silica member is formed. Undoped core (high index of refraction material) surrounded by fluorine doped cladding (low index of refraction material) having desired diameter and length is formed. The duration of the silica deposition for certain substrate cross section and size can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length.

Example No. 6

Doped Core and Fluorine Doped Graded Index of Refraction Cladding Fiber Optic Preform Fabrication Step 1.

Rotating and translating, a substrate consisting of porous tubing is heated to a temperature of about 1300° C. and is subjected to plurality of silica and dopant particle stream introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

The so formed vitrified tubular silica body is heated to temperature of about 1300° C. and is subjected to plurality of silica particle stream introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 4.

Introducing silicon tetra fluoride, $SiF_4$, through the porous substrate and/or the chamber into the deposited porous silica material for $T_1$ hours at temperature of 800-1400° C., the silica material is doped. T☐ is about 0.3 to 2 hours.

Step 5.

The substrate and/or chamber temperature is raised to about 1400-1500° C. while rotating the substrate. The newly deposited porous silica is vitrified, and a tubular silica body having desired doped inner wall thickness $IW_t$ and undoped outer wall $OW_t$ desired wall thickness is formed.

Step 6.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 7.

Introducing silicon tetra fluoride, $SiF_4$, through the porous substrate and/or the chamber into the deposited porous silica material for $T_2>T_1$ hours at a temperature of about 1100° C.-1400° C., the silica material is doped. $T_2$ is about 0.4-4 hours.

Step 8.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 9.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 10.

Introducing silicon tetra fluoride, $SiF_4$, through the porous substrate and/or the chamber into the deposited porous silica material for $T_3>T_2$ hours at temperature of about 1100° C.-1400° C., the silica material is doped. $T_3$ is about 0.5-5 hours.

Step 11.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 12.

The so formed vitrified tubular silica body is heated to temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 13.

Introducing silicon tetra fluoride, $SiF_4$, through the porous substrate and/or the chamber into the deposited porous silica material for $T_4>T_3$ hours at temperature of about 1100° C.-1400° C., the silica material is doped. $T_4$ is about 0.6 to 6 hours Step 14.

The substrate and/or chamber temperature is raised to 1400-1600° C. while rotating the substrate. The newly deposited porous silica is vitrified and a tubular silica body having desired doped inner wall thickness $IW_t$ and undoped outer wall $OW_t$ desired wall thickness is formed.

Steps 15-17.

Repeat Steps 12-14 while further reducing the exposure to gaseous dopant, $SiF_4$ in this case.

Step 18.

The substrate is transferred out of the deposition chamber area and the substrate is removed. If wetting between the substrate and silica occurs, the substrate is heated to the softening point of the silica. The contact between the substrate and the silica member is melted and the substrate is removed.

Step 19.

The so formed silica member is collapsed and a solid rod like silica member is formed. Undoped core (high index of refraction material) surrounded by graded index of refraction fluorine doped cladding (low index of refraction material) having desired diameter and length is formed. The duration of the silica deposition for certain substrate cross section and size can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length.

Example No. 7

Doped Core Having Graded Index of Refraction and Fluorine Doped Graded Index of Refraction Cladding Fiber Optic Preform Fabrication Step 1.

Rotating and translating, a substrate consisting of porous tubing is heated to a temperature of about 1300° C. and is subjected to plurality of silica and dopant particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

Rotating and translating, a substrate consisting of porous tubing is heated to a temperature of about 1300° C. and is subjected to plurality of silica particle streams and reduced dopant particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 4.

The substrate and/or chamber temperature is raised to about 1400-1600° C. while rotating the substrate and maintained there for certain time interval. A vitrified tubular silica body having desired wall thickness is formed.

Step 5.

Rotating and translating, a substrate consisting of porous tubing is heated to a temperature of about 1300° C. and is subjected to plurality of silica particle streams and further reduced dopant particle streams introduced via ports on the chamber. The accelerated particles collide with the substrate and deposit themselves on the substrate. Subsequent particles deposit on the material already deposited and layer by layer the silica member is formed. Porous silica body having about 25-35% solid glass density is obtained by this process.

Step 6.

The substrate and/or chamber temperature is raised to about 1400-1600° C. while rotating the substrate and maintained there for certain time interval. A vitrified tubular silica body having desired wall thickness is formed.

Step 7-9.

Repeat steps 4-6 further reducing the dopant levels in the deposited silica by lowering the dopant concentrations in the dopant particle streams, etc.

Step 10.

The so formed vitrified tubular silica body is heated to temperature of 1300° C. and is subjected to plurality of silica particle stream introduced via ports on the chamber. The so accelerated particles collide with the substrate and deposit themselves on the substrate. Subsequent particles deposit on the material already deposited and layer by layer the silica member is formed. Porous silica body having 25-35% solid glass density is obtained by this process.

Step 11.

Introducing silicon tetra fluoride, $SiF_4$, through the porous substrate and/or the chamber into the deposited porous silica material for $T_1$ hours at temperature of about 1100° C.-1400° C. the silica material is doped. $T_1$ is about 0.3 to 2 hours.

Step 12.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 13.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. Porous silica body having about 25-35% solid glass density is obtained by this process Step 14.

Introducing silicon tetra fluoride, $SiF_4$, through the porous substrate and/or the chamber into the deposited porous silica material for $T_2>T_1$ hours at temperature of about 1100° C.-1400° C. the silica material is doped. $T_2$ is about 0.4 to 4 hours.

Step 15.

The substrate and/or chamber temperature is raised to about 1400-1500° C. while rotating the substrate. The newly deposited porous silica is vitrified, and a tubular silica body having desired doped inner wall thickness $IW_t$ and undoped outer wall $OW_t$ desired wall thickness is formed.

Step 16.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 17.

Introducing silicon tetra fluoride, $SiF_4$, through the porous substrate and/or the chamber into the deposited porous silica material for $T_3>T_2$ hours at temperature of about 1100° C.-1400° C. the silica material is doped. $T_3$ is about 0.6 to 6 hours.

Step 18.

The substrate and/or chamber temperature is raised to about 1400-1600° C. while rotating the substrate. The newly deposited porous silica is vitrified, and a tubular silica body having desired doped inner wall thickness $IW_t$ and undoped outer wall $OW_t$ desired wall thickness is formed.

Step 19.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having 25-35% solid glass density is obtained by this process.

Step 20.

Introducing silicon tetra fluoride, $SiF_4$, through the porous substrate and/or the chamber into the deposited porous silica material for $T_4>T_3$ hours at temperature of 1100° C.-1400° C., the silica material is doped. $T_4$ is about 0.6 to 6 hours Step 21.

The substrate and/or chamber temperature is raised to about 1400-1600° C. while rotating the substrate. The newly deposited porous silica is vitrified and a tubular silica body having desired doped inner wall thickness $IW_t$ and undoped outer wall $OW_t$ desired wall thickness is formed.

Step 22-24.

Repeat Steps 12-14 while further reducing the exposure to gaseous dopant, SiF4 in this case.

Step 25.

The substrate is transferred out of the deposition chamber area and the substrate is removed. If wetting between the substrate and silica occurs, the substrate is heated to the softening point of the silica. The contact between the substrate and the silica member is melted and the substrate is removed.

Step 26.

The so formed silica member is collapsed and a solid rod like silica member is formed. Undoped core (high index of refraction material) surrounded by graded index of refraction fluorine doped cladding (low index of refraction material) having desired diameter and length is formed. The duration of the silica deposition for certain substrate cross sections and sizes can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length. The radial distribution of the index of refraction in the core and the cladding will depend on the thickness of the doped layer deposited and on the pore density in the as deposited preform.

Example No. 8

Doped Core Having Graded Index of Refraction and Fluorine Doped Cladding Having Graded Index of Refraction Fiber Optic Preform Fabrication Step 1.

Rotating and translating, a substrate consisting of porous tubing is heated to a temperature of about 1300° C. and is subjected to plurality of silica and dopant particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

Rotating and translating, a substrate consisting of porous tubing is heated to a temperature of about 1300° C. and is subjected to plurality of silica particle stream and reduced concentration dopant particle streams introduced via ports on the chamber. The accelerated particles collide with the substrate and deposit themselves on the substrate. Subsequent particles deposit on the material already deposited and layer by layer the silica member is formed. A porous silica body having about 25-35% fused silica density is obtained by this process.

Step 4.

The substrate and/or chamber temperature is raised to about 1400-1600° C. while rotating the substrate and maintained there for certain time interval. A vitrified tubular silica body having desired wall thickness is formed.

Step 5.

Rotating and translating, a substrate consisting of porous tubing is heated to a temperature of about 1300° C. and is subjected to plurality of silica particle streams and further reduced concentration dopant particle stream introduced via ports on the chamber. The so accelerated particles collide with the substrate and deposit themselves on the substrate. Subsequent particles deposit on the material already deposited and layer by layer the silica member is formed. A porous silica body having about 25-35% fused silica density is obtained by this process.

Step 6.

The substrate and/or chamber temperature is raised to about 1400-1600° C. while rotating the substrate and maintained there for certain time interval. A vitrified tubular silica body having desired wall thickness is formed.

Step 7-9.

Repeat steps 4-6 further reducing the dopant levels in the deposited silica by further lowering the dopant concentrations in the dopant particle stream. Repeat until the desired index of refraction profile in radial direction is obtained.

Step 10.

The so formed vitrified tubular silica body is heated to a temperature of about 1380° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 80-90% fused silica density is obtained by this process.

Step 11.

The so formed silica body is heated to a temperature of about 1370° C. and is subjected to plurality of silica particle stream introduced via ports on the chamber. The accelerated particles collide with the substrate and deposit themselves on the substrate. Subsequent particles deposit on the material already deposited and layer by layer the silica member is formed. A porous silica body having about 75-85% solid glass density is obtained by this process.

Step 12.

The so formed vitrified tubular silica body is heated to temperature of 1360° C. and is subjected to plurality of silica particle stream introduced via ports on the chamber. The so accelerated particles collide with the substrate and deposit themselves on the substrate. Subsequent particles deposit on the material already deposited and layer by layer the silica member is formed. A porous silica body having about 65-75% fused silica density is obtained by this process.

Step 13.

The so formed vitrified tubular silica body is heated to a temperature of about 1330° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 50-60% fused silica density is obtained by this process.

Step 14.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% fused silica density is obtained by this process.

Step 15.

Introducing silicon tetra fluoride, $SiF_4$, through the chamber into the deposited porous silica material for about 0.3-6 hours at temperature of 1100° C.-1400° C. the silica material is doped. The amount of the $SiF_4$ penetrating the cladding will be proportional to the pore density and the exposure time at given temperature of the preform.

Step 16.

The substrate and/or chamber temperature is raised to about 1400-1600° C. while rotating the substrate. The newly deposited porous silica is vitrified, and a tubular silica body having desired cladding layer wall thickness is formed. Repeat until the desired index of refraction profile in radial direction is obtained.

Step 17.

The substrate is transferred out of the deposition chamber area and the substrate is removed. If wetting between the substrate and silica occurs, the substrate is heated to the softening point of the silica. The contact between the substrate and the silica member is melted and the substrate is removed.

Step 18.

The so formed silica member is collapsed and a solid rod like silica member is formed. Undoped core (high index of refraction material) surrounded by graded index of refraction fluorine doped cladding (low index of refraction material) having desired diameter and length is formed. The duration of the silica deposition for certain substrate cross sections and sizes can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length. The radial distribution of the index of refraction in the core and the cladding will depend on the thickness of the doped layer deposited and on the pore density in the deposited preform.

Example No. 9

Fluorine Doped Cladding Having Graded Index of Refraction Fiber Optic Preform Fabrication Using Prefabricated Doped or Undoped Core Rod Step 1.

Prefabricated silica doped or undoped rod is heated to a temperature of about 1400° C. and is subjected to plurality of silica particle streams introduced via ports on the chamber. The so accelerated particles collide with the substrate and deposit themselves on the substrate. Subsequent particles deposit on the material already deposited and layer by layer the silica member is formed. A porous silica body having about 90-100% fused silica density is obtained by this process.

Step 2.

Prefabricated silica doped or undoped rod is heated to a temperature of about 1380° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 80-90% fused silica density is obtained by this process.

Step 3.

The so formed silica body is heated to a temperature of about 1370° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 75-85% solid glass density is obtained by this process.

Step 4.

The so formed vitrified tubular silica body is heated to a temperature of about 1360° C. and is subjected to plurality of silica particle stream introduced via ports on the chamber. The accelerated particles collide with the substrate and deposit themselves on the substrate. Subsequent particles deposit on the material already deposited and layer by layer the silica member is formed. A porous silica body having about 65-75% fused silica density is obtained by this process.

Step 5.

The so formed vitrified tubular silica body is heated to a temperature of about 1330° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 50-60% fused silica density is obtained by this process.

Step 6.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% fused silica density is obtained by this process.

Step 7.

Introducing silicon tetra fluoride, $SiF_4$, through the chamber into the deposited porous silica material for about 0.3-6 hours at temperature of about 1100°-1400° C. the silica material is doped. The amount of the $SiF_4$ penetrating the cladding will be proportional to the pore density and the exposure time at given temperature of the preform.

Step 8.

The substrate and/or chamber temperature is raised to about 1400-1600° C. while rotating the substrate. The newly deposited porous silica is vitrified, and a tubular silica body having desired cladding layer wall thickness is formed. Repeat until the desired index of refraction profile in radial direction is obtained.

Step 26.

The so formed silica member is vitrified and a solid rod like silica member is formed. Doped or undoped core (high index of refraction material) surrounded by graded index of refraction fluorine doped cladding (low index of refraction material) having desired diameter and length is formed. The duration of the silica deposition for certain substrate cross sections and sizes can be adjusted to allow for various ratios between the core diameter and the outside cladding layer diameter of the fiber optic preform, e.g., 1:2, 1:3, 1:5, etc. The length of the chamber and the translation capabilities can provide basis for fabrication fiber optic preforms that are up 6 inches or more in diameter and several meters in length. The radial distribution of the index of refraction in the core and the cladding will depend on the thickness of the doped layer deposited and on the pore density in the as deposited preform.

Example No. 10

Process for Fabrication of Fluorine Doped Cladding Tube Having Graded Index of Refraction Fiber Optic Preform Fabrication Step 1.

Rotating and translating, a substrate consisting of porous tubing is heated to a temperature of about 1400° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 90-100% fused silica density is obtained by this process.

Step 2.

Prefabricated silica doped or undoped rod is heated to a temperature of about 1380° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 80-90% fused silica density is obtained by this process.

Step 3.

The so formed silica body is heated to a temperature of about 1370° C. and is subjected to plurality of silica particle streams introduced via ports on the chamber. The so accelerated particles collide with the substrate and deposit themselves on the substrate. Subsequent particles deposit on the material already deposited and layer by layer the silica member is formed. A porous silica body having about 75-85% solid glass density is obtained by this process.

Step 4.

The so formed vitrified tubular silica body is heated to a temperature of about 1360° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 65-75% fused silica density is obtained by this process.

Step 5.

The so formed vitrified tubular silica body is heated to a temperature of about 1330° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 50-60% fused silica density is obtained by this process.

Step 6.

The so formed vitrified tubular silica body is heated to a temperature of about 1300° C. and is subjected to plurality of silica particle streams introduced via ports on the chamber. The accelerated particles collide with the substrate and deposit themselves on the substrate. Subsequent particles deposit on the material already deposited and layer by layer the silica member is formed. A porous silica body having about 25-35% fused silica density is obtained by this process.

Step 7.

Introducing silicon tetra fluoride, $SiF_4$, through the porous substrate and the chamber into the deposited porous silica material for about 0.3-6 hours at temperature of about 1100° C.-1400° C., the silica material is doped. The amount of the $SiF_4$ penetrating the cladding will be proportional to the pore density and the exposure time at given temperature of the preform.

Step 8.

The substrate and/or chamber temperature is raised to about 1400-1600° C. while rotating the substrate. The porous silica is vitrified and a tubular silica body having desired cladding layer wall thickness is formed.

Step 9.

The substrate is transferred out of the deposition chamber area and the substrate is removed. If wetting between the substrate and silica occurs, the substrate is heated to the softening point of the silica. The contact between the substrate and the silica member is melted and the substrate is removed. The duration of the silica deposition for certain substrate cross sections and sizes can be adjusted to allow for various ratios between the inner diameter and the outside diameter of the tubing fiber optic preform, e.g., 1:2, 1:3, 1:5, etc. The length of the chamber and the translation capabilities can provide basis for fabrication doped tubing for fiber optic preforms that are up 12 inches or more in diameter and several meters in length. The radial distribution of the index of refraction in the cladding will depend on the thickness of the doped layer deposited and or the pore density in the as deposited preform.

Example No. 11

Doped Core Having Graded Index of Refraction for Fiber Optic Preform Fabrication Step 1.

Rotating and translating, a substrate consisting of porous tubing is heated to a temperature of about 1300° C. and is subjected to plurality of silica and dopant particle streams introduced via ports on the chamber. The accelerated particles collide with the substrate and deposit themselves on the substrate. Subsequent particles deposit on the material already deposited and layer by layer the silica member is formed. A porous silica body having about 25-35% solid glass density is obtained by this process.

Step 2.

The substrate and/or chamber temperature is raised to about 1400-1600° C. while rotating the substrate and maintained there for certain time interval. A vitrified tubular silica body having desired wall thickness is formed.

Step 3.

Rotating and translating, a substrate consisting of porous tubing is heated to a temperature of about 1300° C. and is subjected to plurality of silica particle streams and reduced concentration dopant particle stream introduced via ports on the chamber. The so accelerated particles collide with the substrate and deposit themselves on the substrate. Subsequent particles deposit on the material already deposited and layer by layer the silica member is formed. A porous silica body having about 25-35% fused silica density is obtained by this process.

Step 4.

The substrate and/or chamber temperature is raised to about 1400-1600° C. while rotating the substrate and maintained there for certain time interval. A vitrified tubular silica body having desired wall thickness is formed.

Step 5.

Rotating and translating, a substrate consisting of porous tubing is heated to a temperature of about 1300° C. and is subjected to plurality of silica particle streams and further reduced concentration dopant particle stream introduced via ports on the chamber. The accelerated particles collide with the substrate and deposit themselves on the substrate. Subsequent particles deposit on the material already deposited and layer by layer the silica member is formed. A porous silica body having about 25-35% fused silica density is obtained by this process.

Step 6.

The substrate and/or chamber temperature is raised to about 1400-1600° C. while rotating the substrate and maintained there for certain time interval. A vitrified tubular silica body having desired wall thickness is formed.

Step 7-9.

Repeat steps 4-6 further reducing the dopant levels in the deposited silica by further lowering the dopant concentrations in the dopant particle stream. Repeat until the desired index of refraction profile in radial direction is obtained.

Step 10.

The substrate is transferred out of the deposition chamber area and the substrate is removed. If wetting between the substrate and silica occurs, the substrate is heated to the softening point of the silica. The contact between the substrate and the silica member is melted and the substrate is removed.

Step 11.

The so formed silica member is collapsed and a solid rod like silica member is formed. Graded index of refraction core having desired diameter and length is formed. The duration of the silica deposition for certain substrate cross sections and sizes can be adjusted to allow for various ratios between the inner diameter and the outside diameter of the tubing fiber optic preform, e.g., 1:2, 1:3, 1:5, etc. The length of the chamber and the translation capabilities can provide basis for fabrication doped cores for fiber optic preforms that are up 12 inches or more in diameter and several meters in length. The radial distribution of the index of refraction in the cladding will depend on the thickness of the doped layer deposited and on the pore density in the deposited preform.

While the invention has been described with reference to specific embodiments, modifications and variations of the invention may be constructed without departing from the scope of the invention, which is defined in the following claims.

I claim:

1. Method for making fused silica products, comprising
providing a chamber,
providing plural parallel substrates positioned in the chamber,
providing a support,
providing first movers on the support,
connecting the first movers to the substrates,
moving the substrates with respect to each other,
providing a second mover connected to a support for the first movers for moving the first movers with respect to the chamber,
disposing silica particle providers in the chamber providing silica particles which deposit on the substrates,
providing heaters in the chamber,
heating the substrates and the particles,
softening and agglomerating surfaces of the particles and sticking the particles on the substrates and on particles stuck to the substrates and creating preforms of the particles on the substrates.

2. The method of claim 1, wherein providing the substrates comprises providing long hollow tubular substrates, and wherein the first movers and second mover rotate the long hollow tubular substrates within the chamber.

3. The method of claim 2, wherein providing the heaters further comprise providing a heater within the hollow tubular substrates and heating the substrates from within.

4. The method of claim 2, further comprising connecting valved purged gas and dopant gas to the hollow tubular substrates.

5. The method of claim 1, further comprising connecting valved vacuum, dopant gas and purge gas ports to the chamber.

6. The method of claim 1, wherein providing the silica particle providers comprises providing burners mounted near walls of the chamber and pyrolyzing silicon compositions and generating silica powder.

7. The method of claim 1, wherein providing the silica particle providers comprises providing silica powder injectors near walls of the chamber.

8. The method of claim 1, wherein providing the second movers further comprise providing rotation and translation mechanisms connected to the support and rotating and translating the substrates in the chamber.

9. The method of claim 8, wherein providing the first mover further comprises providing independent adjustment and support mechanisms connected to the support which is connected to rotation and translation mechanisms, and further comprising providing plural adjusters connected to independent rotation and support mechanisms and moving the plural substrates and rotating them with respect to each other as the rotation and support mechanisms rotate and translate the substrates within the chamber.

10. The method of claim 1, further comprising providing heat controls connected to the heaters and increasing temperature within the chamber to vitrification temperatures and vitrifying and densifying the preforms in the chamber.

11. The method of claim 1, wherein the chamber, the at least one substrate and the preform are vertically oriented, and wherein the particle providers provide particles from cylindrical side areas of the chamber.

12. The method of claim 11, wherein the chamber is a preform forming chamber further comprising the providing a preform melting chamber below the preform forming chamber, and providing a movable shelf separating the preform forming chamber and the preform melting chamber, providing heaters adjacent walls of the preform melting chamber and providing valved ports connected to the preform melting chamber for providing gas delivery, gas venting, vacuum and dopants, and providing multiple heating zones in the chambers, and further comprising providing a rotating and pulling assembly connected to the preform melting chamber and withdrawing a fused silica member from the preform chamber.

13. The method of claim 12, further comprising providing a plasma surface removal unit positioned below the rotating and pulling assembly and finishing a surface of the fused silica member.

14. The method of claim 12, further comprising providing a plate and bar forming chamber, providing an input connected to the rotating and pulling assembly and withdrawing the fused silica member directly into the plate and bar forming chamber.

15. A method of producing fused silica fiber optic preforms, comprising:
providing a chamber,
providing a plurality of substrates within the chamber,
relatively rotating the plurality of substrates with respect to each other in the chamber,
heating the chamber and the substrates,
feeding silica particles into the chamber toward the substrates,
fusing silica particles on the substrates,
sticking particles to particles held on the substrates and forming porous silica preforms on the substrates, and
relatively moving the substrates and preforms in the chamber.

16. The method of claim 15, wherein the feeding of silica particles comprises generating silica particles with pyrolysis of silica particle precursors from wall-mounted burners.

17. The method of claim 15, wherein the feeding of silica particles further comprises feeding silica particle streams toward the substrate and preform.

18. The method of claim 17, further comprising
providing dopant gases to the chamber and through the substrate, and
providing purge gas to the chamber and through the substrate, and
venting and removing gases from the chamber.

19. The method of claim 15, wherein the moving comprises relatively rotating and translating the substrates and preforms within the chamber.

20. The method of claim 15, further comprising
stopping the feeding of silica particles,
increasing heat on the preforms, and
densifying and vitrifying the preforms.

21. The method of claim 20, further comprising
depositing second layers of fused silica on the densified and vitrified silica preforms.

22. The method of claim 15, further comprising
providing doped or undoped silica cores on the substrates and
depositing doped or undoped cladding layers on the silica cores.

23. The method of claim 15, wherein the heating includes heating the substrates to a certain temperature and maintaining the temperature for a certain time interval.

24. The method of claim 15, wherein the heating is accomplished via at least one of resistive heating and RF coil heating.

25. The method of claim 15, wherein the heating is accomplished via a heating element located within at least one of the substrates.

26. The method of claim 15, wherein feeding silica particles occurs subsequent to the heating of the chamber and substrates.

27. The method of claim 15, wherein at least one of the substrates includes a hemispherical end portion.

28. The method of claim 15, further comprising:
providing a pulling mechanism adjacent at least one of the substrates.

29. The method of claim 15, wherein providing a chamber includes providing a plurality of chambers and separately controlling heating in each of the plurality of chambers.

30. The method of claim 15, wherein providing a chamber includes providing a plurality of chambers and separately controlling pressure in each of the plurality of chambers.

31. The method of claim 15, wherein providing a chamber includes providing a plurality of chambers and separately controlling dopant quantity in each of the plurality of chambers.

32. The method of claim 15, further comprising:
providing an electric field generator adjacent at least one of the substrates.

33. A method of producing fused silica fiber optic preforms, comprising
providing a chamber configured to provide a controllable environment separate from an exterior ambient room environment,
controlling at least one of temperature and dopant quantity within the chamber;
controlling pressure within the chamber;
providing at least one substrate within the chamber,
relatively rotating the at least one substrate in the chamber,
heating the chamber and the at least one substrate,
feeding silica particles into the chamber,
fusing silica particles on the at least one substrate,
sticking particles to particles held on the at least one substrate and forming a porous silica preform on the at least one substrate,
moving the at least one substrate and preform in the chamber, and
providing a plurality of substrates, wherein the moving comprises relatively rotating and translating the plurality of substrates and preforms within the chamber.

34. The method of claim 33, wherein the feeding of silica particles comprises generating silica particles with pyrolysis of silica particle precursors from wall-mounted burners.

35. The method of claim 33, wherein the feeding of silica particles further comprises feeding silica particle streams toward the at least one substrate and preform.

36. The method of claim 35, further comprising:
providing dopant gases to the chamber and the at least one substrate,
providing purge gas to the chamber and the at least one substrate, and
venting and removing gases from the chamber.

37. The method of claim 33, further comprising
stopping the feeding of silica particles,
increasing heat on the preform, and
densifying and vitrifying the preform.

38. The method of claim 37, further comprising
depositing second layers of fused silica on the densified and vitrified silica preform.

39. The method of claim 33, further comprising
providing a doped or undoped silica core on the at least one substrate and depositing doped or undoped cladding layers on the silica core.

40. The method of claim 33, wherein the controlling of temperature includes heating the at least one substrate such that the substrate is at a uniform temperature throughout.

41. The method of claim 33, wherein the controlling of temperature is accomplished via at least one of resistive heating and RF coil heating.

42. The method of claim 33, wherein the controlling of temperature is accomplished via a heating element located within the at least one substrate.

43. The method of claim 33, wherein feeding silica particles occurs subsequent to the heating of the chamber and the at least one substrate.

44. The method of claim 33, wherein the at least one substrate includes a hemispherical end portion.

45. The method of claim 33, further comprising:
providing a pulling mechanism adjacent the at least one substrate.

46. The method of claim 33, wherein providing a chamber includes providing a plurality of chambers and separately controlling heating in each of the plurality of chambers.

47. The method of claim 33, wherein providing a chamber includes providing a plurality of chambers and separately controlling pressure in each of the plurality of chambers.

48. The method of claim 33, wherein providing a chamber includes providing a plurality of chambers and separately controlling dopant quantity in each of the plurality of chambers.

49. The method of claim 33, further comprising:
providing an electric field generator adjacent the at least one substrate.

50. The method of claim 33, further comprising:
forming the preform as a doped or undoped solid body.

51. The method of claim 50, further comprising:
depositing doped or undoped silica on the solid body.

52. The method of claim 15, further comprising:
forming the preforms into doped or undoped solid bodies.

53. The method of claim 52, further comprising:
depositing doped or undoped silica on the solid bodies.

54. The method of claim 1, further comprising:
forming the preforms as doped or undoped solid bodies.

55. The method of claim 54, further comprising:
depositing doped or undoped silica on the solid bodies.

56. The method of claim 15, wherein relatively moving includes relatively moving the preforms and substrate with respect to the chamber.

57. The method of claim 15, further comprising:
directing silica particle streams toward the substrates and preforms.

58. The method of claim 15, further comprising:
feeding dopant gases into the chamber and to at least one of the substrates,
feeding purge gas to the chamber and to at least one of the substrates, and
venting and removing gases from the chamber.

59. The method of claim 15, further comprising:
providing a doped or undoped silica core on at least one of the substrates for depositing a doped or undoped cladding layer on the silica core.

60. The method of claim 33, wherein feeding silica particles includes feeding the silica particles from a silica stream generator located adjacent a wall of the chamber.

61. The method of claim 33, wherein controlling pressure includes maintaining a substantial vacuum within the chamber.

* * * * *